(12) United States Patent
Savage

(10) Patent No.: US 8,404,098 B2
(45) Date of Patent: Mar. 26, 2013

(54) DEVICES, APPARATUS, METHODS AND PROCESSES FOR GENERATING HYDROGEN, OXYGEN AND ELECTRICITY FROM CHEMICAL COMPOUNDS WITHOUT PRODUCING UNDESIRABLE BY-PRODUCTS

(75) Inventor: Thomas Charles Savage, London (CA)

(73) Assignee: Diaxiom Technologies Inc., London, Ontario (CA)

( * ) Notice: Subject to any disclaimer, the term of this patent is extended or adjusted under 35 U.S.C. 154(b) by 1067 days.

(21) Appl. No.: 12/197,211

(22) Filed: Aug. 22, 2008

(65) Prior Publication Data

US 2009/0078560 A1 Mar. 26, 2009

Related U.S. Application Data

(60) Provisional application No. 60/957,590, filed on Aug. 23, 2007, provisional application No. 61/136,086, filed on Aug. 11, 2008.

(51) Int. Cl.
*C25C 1/02* (2006.01)
(52) U.S. Cl. ........................................................ 205/628
(58) Field of Classification Search ................... 205/628
See application file for complete search history.

(56) References Cited

U.S. PATENT DOCUMENTS

| | | | |
|---|---|---|---|
| 2,070,612 A | 2/1937 | Niederreither | |
| 3,942,975 A | 3/1976 | Drummond | |
| 4,162,302 A | 7/1979 | Hirayama | |
| 4,427,512 A | 1/1984 | Han | |
| 4,476,105 A | 10/1984 | Greenbaum | |
| 6,458,478 B1 | 10/2002 | Wang | |
| 6,780,396 B2 | 8/2004 | Streicher | |
| 6,887,601 B2 * | 5/2005 | Moulthrop et al. | 429/418 |
| 6,977,120 B2 * | 12/2005 | Chou et al. | 429/422 |
| 7,384,619 B2 | 6/2008 | Bar-Gadda | |
| 2005/0077187 A1 | 4/2005 | Nakagiri | |
| 2005/0276366 A1 * | 12/2005 | Dash | 376/100 |
| 2006/0133993 A1 * | 6/2006 | Dieckmann et al. | 423/651 |
| 2008/0043895 A1 | 2/2008 | Shehane | |
| 2008/0131360 A1 | 6/2008 | Adams | |
| 2008/0131744 A1 | 6/2008 | Adams | |
| 2008/0138676 A1 | 6/2008 | Adams | |
| 2008/0187819 A1 * | 8/2008 | Lang | 429/50 |
| 2009/0072545 A1 * | 3/2009 | Van Michaels | 290/1 A |
| 2009/0226774 A1 * | 9/2009 | Friscia | 429/17 |

OTHER PUBLICATIONS

Koichi Tomikawa and Hitoshi Kanno, Raman Study of Sulfuric Acid at Low Temperatures, J. Phys. Chem A 1998, 102, 6082-6088.

* cited by examiner

*Primary Examiner* — Lore Jarrett

(57) ABSTRACT

Devices, apparatus, methods and processes are adapted and arranged to efficiently produce both hydrogen and oxygen, while at the same time producing electricity. Advantageously, virtually no undesirable by-products are produced, thus yielding environmentally friendly sources of fuels and energy. Through the cyclic use and re-use of acidic compounds, and especially sulfuric acid, water is processed to produce hydrogen, oxygen and electricity. One or more of the hydrogen, oxygen and electrical output of the methods, devices and apparatus of the invention can be stored, or can be used in many ways, for example, in a fuel cell to produce additional electricity or other reaction products. Hydrogen and oxygen produced by the invention can be combined in an engine, such as an internal combustion engine, to power a vehicle, while electricity produced simultaneously can be used to power other features of the vehicle, such as radios and communications equipment as well as electrical motors commonly found in hybrid vehicles. The invention is also ideal as an ideal source of power for uses where efficiency and the cyclic use of resources are paramount, such as for providing electricity and fuel for use in homes and industry.

24 Claims, 12 Drawing Sheets

DEVICES, APPARATUS, METHODS AND PROCESSES FOR GENERATING HYDROGEN, OXYGEN AND ELECTRICITY FROM CHEMICAL COMPOUNDS WITHOUT PRODUCING UNDESIRABLE BY-PRODUCTS

PRIORITY CLAIM AND CROSS-REFERENCE TO RELATED APPLICATIONS

Applicant hereby claims priority to U.S. Provisional Patent Application Ser. No. 60/957,590, which was filed Aug. 23, 2007, and to U.S. Provisional Patent Application Ser. No. 61/136,086, which was filed Aug. 11, 2008. Both of these applications are hereby incorporated by reference in their entireties.

TECHNICAL FIELD

The present invention relates to the net electrochemical production of one or more of hydrogen, oxygen and electricity. In particular, the invention comprises methods, processes, devices and apparatus that are adapted and arranged to efficiently produce both hydrogen and oxygen, while at the same time producing electricity. One or more of the hydrogen, oxygen and electrical output of the methods, devices and apparatus of the invention can be stored, or can be used in many ways, for example in a fuel cell to produce additional electricity or other reaction products, or in combination with other devices or methods.

BACKGROUND OF THE INVENTION

A fuel cell is a device that uses a chemical reaction to produce electricity. A typical fuel cell uses the chemical reaction between hydrogen and oxygen to produce electricity. In most fuel cells, the only byproduct of the process is water. The fuel cell requires a constant supply of hydrogen, which typically combines with atmospheric oxygen. Because hydrogen is found in the environment only in compound form, it must first be produced.

There are many known methods for producing hydrogen. The simplest is the electrolysis of water; however, this method requires large amounts of electricity and is not economically feasible on an industrial scale. Currently, the predominant method of producing hydrogen on an industrial scale is the catalytic oxidation of hydrocarbons. Although such methods have higher efficiency than the electrolysis of water, they also produce other problems. As one example, a byproduct of processes using hydrocarbons is the production of carbon oxides such as carbon monoxide and carbon dioxide. The toxicity of carbon monoxide requires that it must be removed or subjected to further processing or storage in order to use this conventional method. Carbon monoxide can be transformed into carbon dioxide; however, this is undesirable because of carbon dioxide's role as a "greenhouse" gas is environmentally damaging. As another significant disadvantage, the conventional processing of hydrocarbons into hydrogen takes place at very high temperatures, requiring expensive fuels and other materials. Indeed, the burning of these fuels disadvantageously creates more gaseous carbon compounds. Moreover, the hydrogen fuel produced from hydrocarbons is not completely free of carbon monoxide. This toxic impurity has a deteriorating effect on the membranes used in typical polymer-electrolyte-membrane fuel cells, causing the performance of the fuel cells to degrade over time.

Numerous attempts have been made to produce and utilize hydrogen and oxygen in economically or environmentally friendly ways. For example, U.S. Pat. No. 2,070,612 to Niederreither discloses a method for storing electrical energy by means of gas batteries, and reversing the electrochemical processes of storage to later provide electrical current as need. The apparatus and methods of Niederreither, however, do not yield hydrogen and oxygen usable outside the system.

U.S. Pat. No. 7,384,619 to Bar-Gadda discloses methods for converting water from steam or vapor form into hydrogen and oxygen by means of conversion into their plasma forms in an electromagnetic field, and then separating and harvesting them. Bar-Gadda requires the maintenance of powerful and expensive plasma fields, however, and produces no reasonable amount of net electrical energy from its cycling. U.S. Pat. No. 4,476,105 to Greenbaum discloses photosynthetic methods for breaking water into hydrogen and oxygen and for utilizing membranes to selectively collect the hydrogen thus produced. Greenbaum requires the careful maintenance of photosynthetic catalysts and sunlight, however, and produces no net electrically.

U.S. Pat. No. 4,162,302 to Hirayama et al discloses methods for decomposing water utilizing metallic oxides to produce sulfuric acid, and then decomposing the sulfuric acid into water, oxygen and sulfur dioxide. Hirayama requires numerous steps and metallic intermediates, however, and produces no net electricity. None of these attempts disclosed in the relevant field combines the production of electricity, hydrogen and oxygen in an economically and environmentally suitable method by yielding virtually no carbon byproducts and no unwanted or unusable chemical species. There is therefore a need for efficient means and methods for doing so.

SUMMARY OF THE INVENTION

The present invention relates to the environmentally friendly production of hydrogen, oxygen and electricity. Advantageously, the present invention produces little or no carbon-based waste materials, such as carbon monoxide and carbon dioxide. Utilizing thermal transfer and electromagnetic fields, hydrogen and oxygen are separated and harvested from a cycle involving sulfuric acid, water and sulfates. The methods and devices of the invention are an efficient source of electricity, oxygen and hydrogen, and can be coupled to other methods and devices to achieve even greater efficiencies, for example in a fuel cell to produce additional electricity or other reaction products, or coupled to energy sources in remote locations. Because of its many positive environmental attributes, the invention is also ideal for powering many types of vehicles such as hybrid vehicles which use electricity as well as combustible fuels.

BRIEF DESCRIPTIONS OF THE SCHEMATIC FIGURES

DESCRIPTION OF THE INVENTION

There is currently a great need in the world for non-carbon-based sources of energy. There is a particularly great need for such energy sources that are environmentally friendly, that can be utilized efficiently, and that can function in many ways to provide energy in continuous or on-demand ways. The advantages of cycling and re-cycling reactants through the present means and methods can be understood with respect to the description of the embodiments provided herein, as well as with respect to the numerous permutations of the components, steps and elements possible within the spirit and scope of the invention.

Chemical mass balance in a system of the invention with respect to the reactants and products is maintained partly by the cyclic nature of certain aspects of the invention as well as by the closed-loop nature of some aspects of the ongoing cycle. Maintenance of this balance is assisted also by the key harvesting features that permit the immediate use, removal into storage, or combinations thereof, with respect to hydrogen, oxygen, and electrons. As another advantageous aspect, charge balance in the system is maintained, for example, by the redistribution of electrons by means of electrodes and other electrical conductors to allow ions to form molecular species and vice versa.

The invention will be described herein with respect to the provided FIGURES. Nonetheless, numerous variations, expressions and embodiments of the methods, processes, apparatus and devices are possible and adaptable within the present disclosure. One preferred embodiment of a device according to the invention will now be described with respect to FIGS. 1-12 in order to illustrate key components of the device and their interrelationships.

Figure 1:
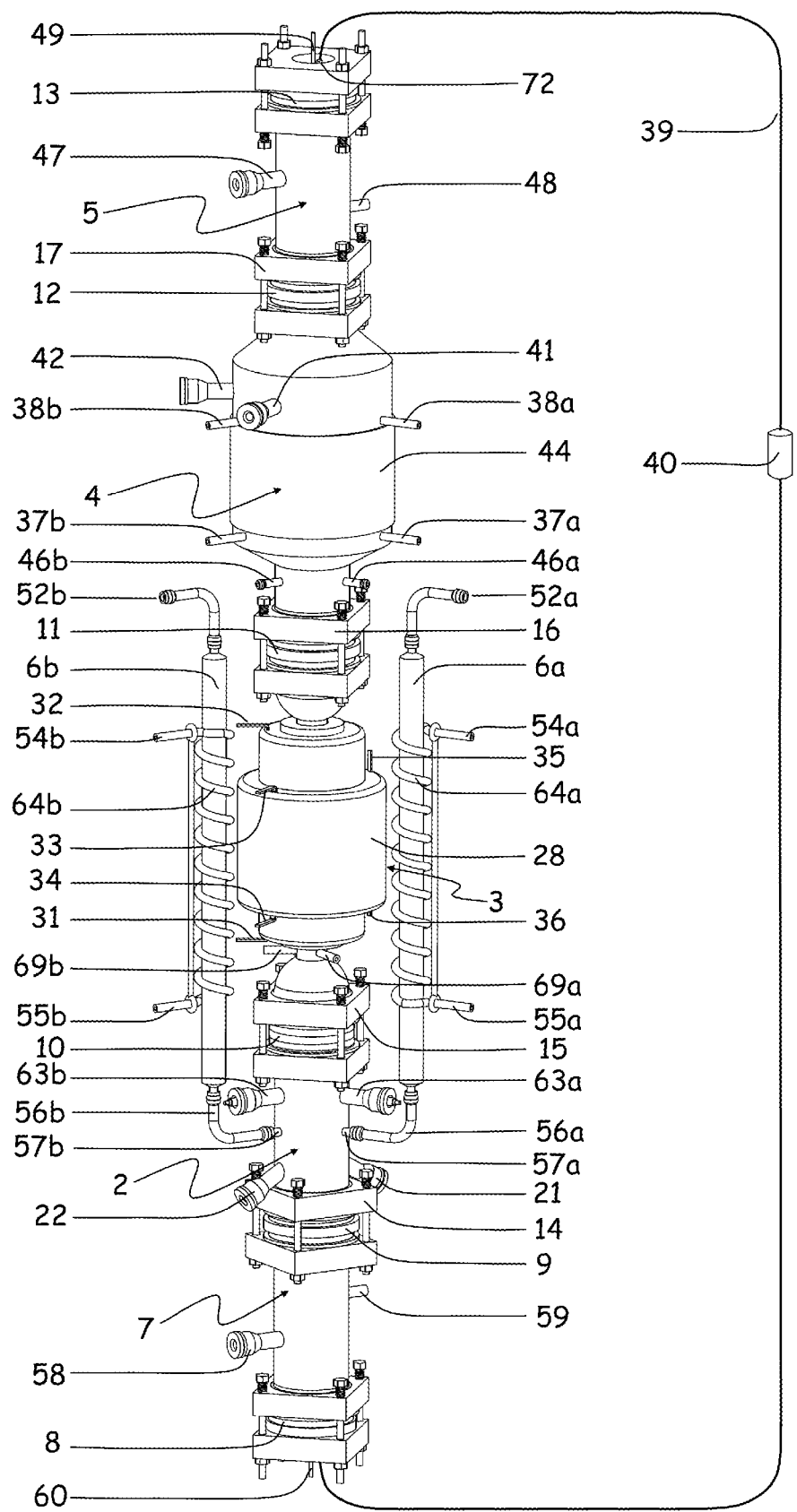
FIG. 1 is an overall view of the exterior of a typical device or apparatus of the invention showing salient components and connections useful in practicing methods and processes of the invention.
Figure 2:
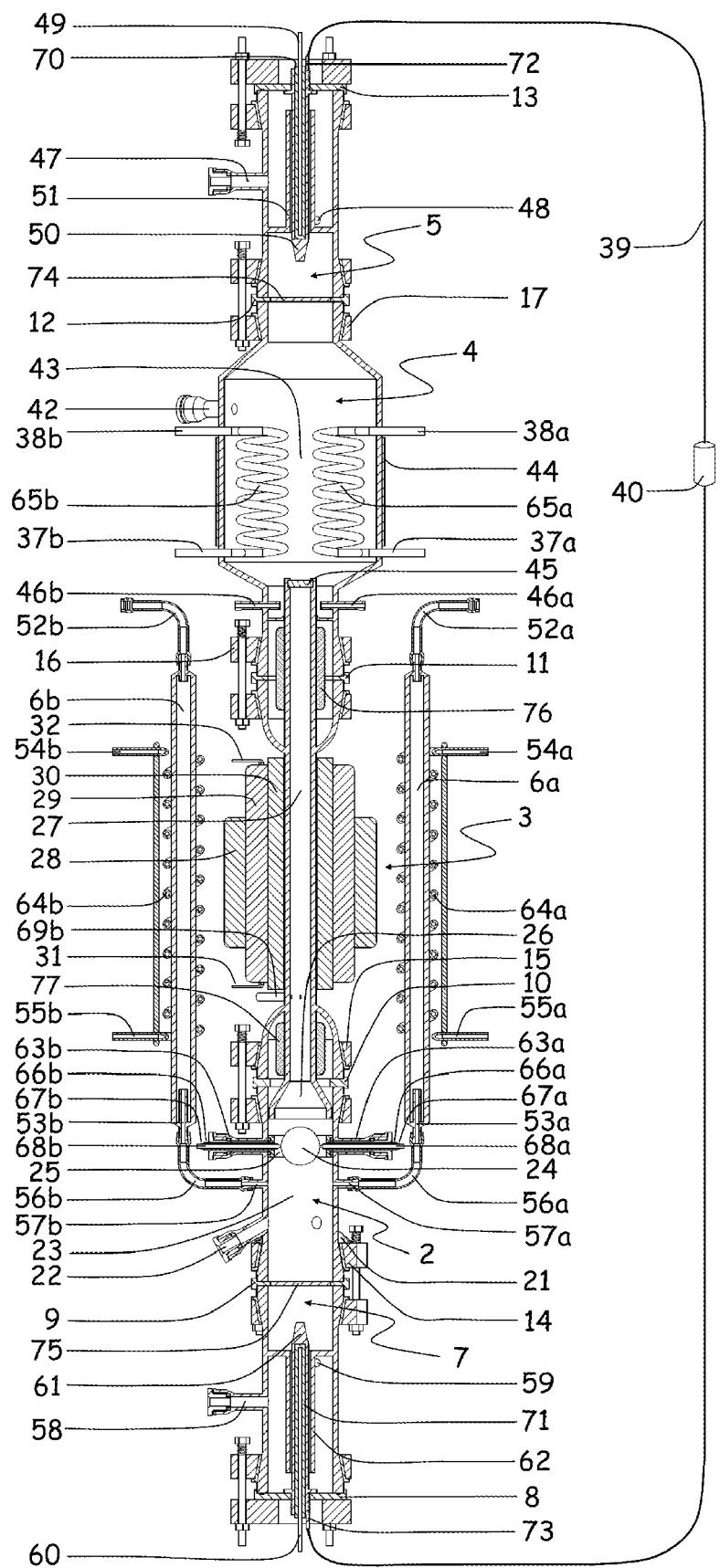
FIG. 2 is a complete cut-away overall view of the device of the invention as shown in FIG. 1, and shows many key internal and external components.
Figure 3:
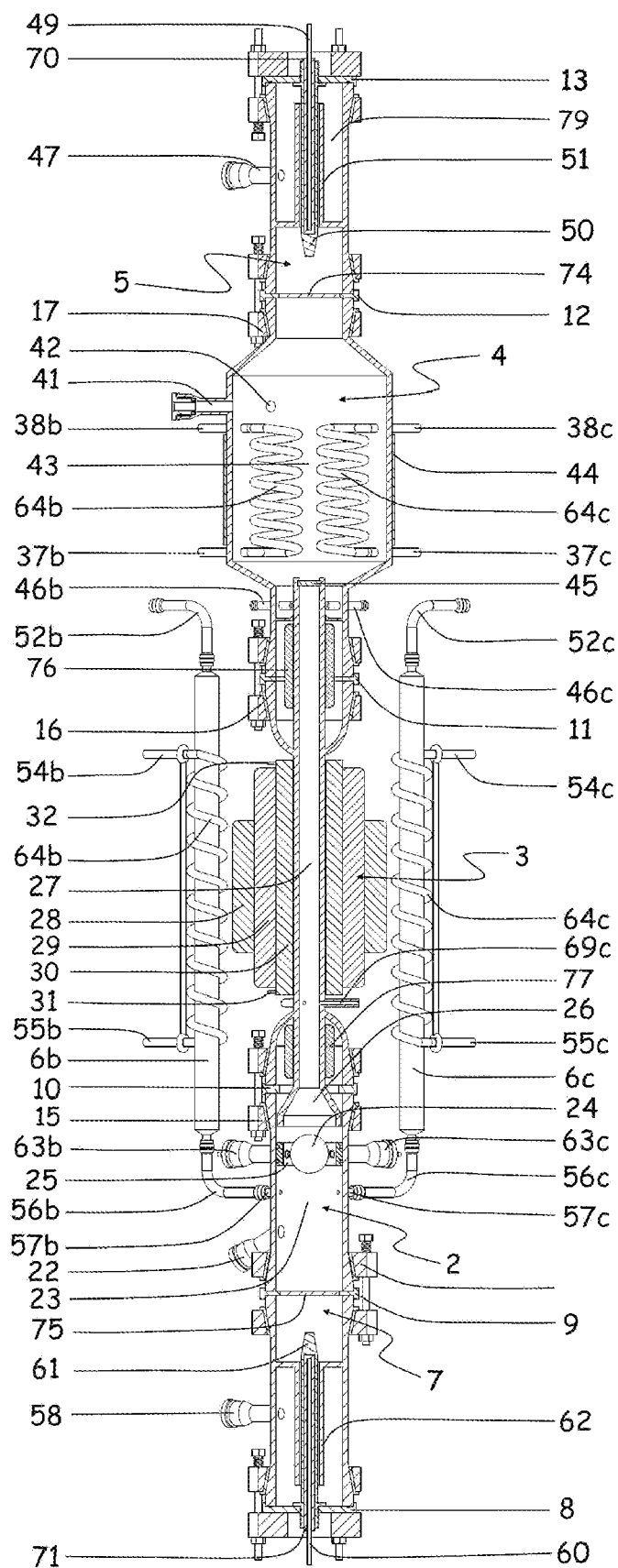
FIG. 3 is a partial cut-away overall view of the invention as shown in FIGS. 1 and 2, and shows some key internal and external components.

FIG. 1 is an overall view of the exterior of a typical device or apparatus of the invention showing salient components and connections useful in practicing methods and processes of the invention. FIG. 2 is a complete cut-away overall view of the device of the invention as shown in FIG. 1, and shows many key internal and external components. FIG. 3 is a partial cut-away overall view of the invention as shown in FIGS. 1 and 2, and shows some key internal and external components.

With respect to FIGS. 1-3, Negatively Charged Copper Electrode 49 is shown disposed at the top of a device of the invention. Upper Cable Terminal 72 is provided for connection to Electrically Conductive Cable 39. PTFE Coupling 13 is provided for sealing Hydrogen Collection Chamber 5 to the top of the device. TORION 47 is provided in communication with Chamber 5 to permit the access of a temperature or pressure sensor. Hydrogen Output Tube 48 is provided in communication with Chamber 5 to permit harvesting of gathered hydrogen. Clamp 17 is provided for sealably connecting Chamber 4 to Chamber 5, as is PTFE Coupling 12. TORION fittings 41 and 42 are provided for access to Chamber 4, for example, for one or more pressure or temperature sensors or monitors.

Coolant Exit Tubes 38a, 38b are provided for the circulation of coolant through Chamber 4, as are Coolant Input Tubes 37a and 37b. Clamp 16 is provided for sealably connecting Chamber 4 to Chamber 3, as is PTFE Coupling 11.

DC Positive Terminal 32, AC Transformer Coil Output 35, AC Transformer Coil Input 33, Transformer Coil 28, AC Transformer Coil Output 36, AC Transformer Coil Input 34 and DC Negative Terminal 31 are all provided to facilitate the creation and management of electromagnetic fields and other electrical processes in various parts of the device as described herein. Fuse 40 is provided interposed in Electrical Cable 39 as a protective feature. Circumferential Capacitor 44 is provided for supplying a positive electrostatic charge around Cooling/Separation Chamber 4.

Coolant Exit Tubes 54a and 54b, as well as Coolant Coils 64a and 64b, and Coolant Inlet Tubes 55a and 55b are provided to cool Sulfate Tubes 6a and 6b, which are disposed for transporting sulfate ions from Cooling/Separation Chamber 4 to Primary Reaction Chamber 2. Secondary Reaction Chamber 3 is adapted and arranged for separating various ionic species from one another by means of electromagnetic fields. Recirculation Tubes 69a, 69b and 69c, preferably made of PTFE, are disposed adjacent the lower portions of Secondary Reaction Chamber 3 to provide, for example, access for adding dilution gasses to the device before or during operation cooling.

Figure 4:
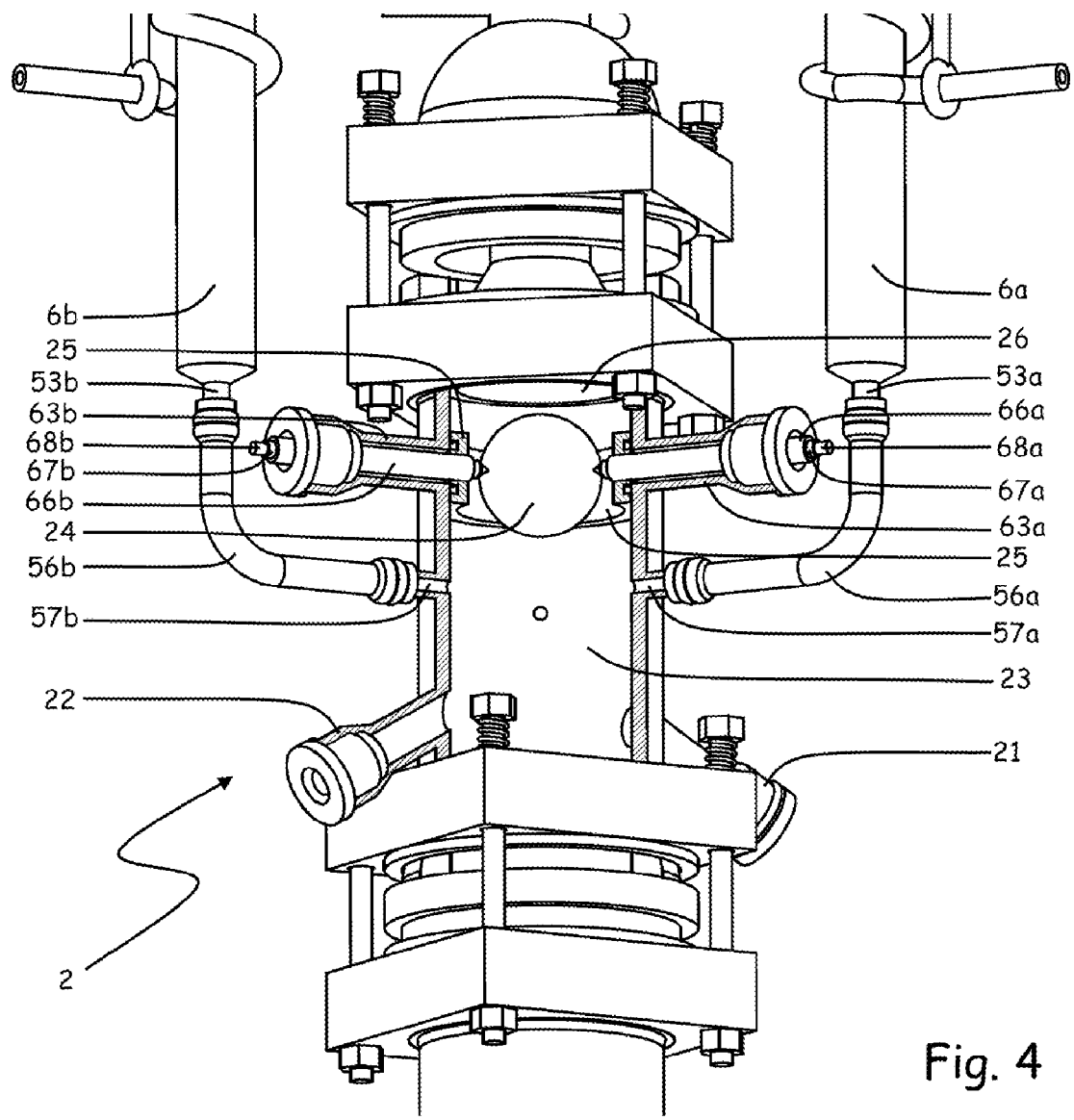
FIG. 4 is an enlarged view of portions of a typical device of the invention including Primary Reaction Chamber 2 and adjoining portions of the invention.

Vacuum Tubes 46a and 46b are adapted and arranged for removing sulfate ions from the bottom portions of Cooling/Separation Chamber 4 for transport via tubes 6 (a, b, c), 56 (a, b, c) and 57 (a, b, c) to be recycled in Primary Reaction Chamber 2, as is also shown in FIG. 4. Tubes 46, 6, 56 and 57 are typically disposed in communication with Sulfate Inlet Tubes 52a and 52b. These interconnecting tubes are thus provided for recycling sulfate ions to Chamber 2.

Clamp 15 is provided for sealably connecting Chamber 3 to Chamber 2, as is PTFE Coupling 10. TORION Fittings 63a, 63b and 63c (not shown due to cutaway) are provided for the input of electrical energy via Electrically Conductive Tubes 66 and 68. Torion fittings 21 and 22 are adapted and arranged as input sites for reactants such as water and sulphur trioxide, and as input sites for non-reactive or otherwise inert dilution gasses (not shown) such as helium or nitrogen.

Pipe Clamp 14 is provided for sealably connecting Oxygen Collection Chamber 7 to Primary Reaction Chamber 2, as is PTFE Coupling 9. Oxygen Output Tube 59 is provided in communication with Chamber 7 to allow harvesting of collected oxygen. TORION Fitting 58 is adapted and arranged as an access site to Chamber 7 for one or more sensors such as pressure and oxygen sensors. PTFE Coupling 8 is provided for sealably connecting Oxygen Collection Chamber 7 to lower parts of the device. Stainless Steel Electrode 60 is electrically connected to Electrode 50 as is also shown in FIGS. 1, 2 and elsewhere.

With respect to FIG. 4, some of the key aspects of the relationships among Primary Reaction Chamber 2, Ball and Ring Structure 24/25 and various reactant Input tubes, as well as related structures of the device and chemical reactants and products, are shown. The reaction of injected sulphur trioxide and water to form primarily sulfuric acid, and residual reactants such as sulfur trioxide and water, occurs in Mixing Zone 23 of Primary Reaction Chamber 2 in the vicinity of Ball 24 and Ring 25. This reaction occurs in an atmosphere comprising one or more dilution gasses (not shown) such as helium, nitrogen, argon and neon. In some preferred embodiments of the devices and methods of the invention, the injection of these two reactants, sulphur trioxide and water, is used to initiate the cycling of the invention. In a key aspect of the invention, Ball 24 and Ring 25 are contained within Primary Reaction Chamber 2.

Figure 6:
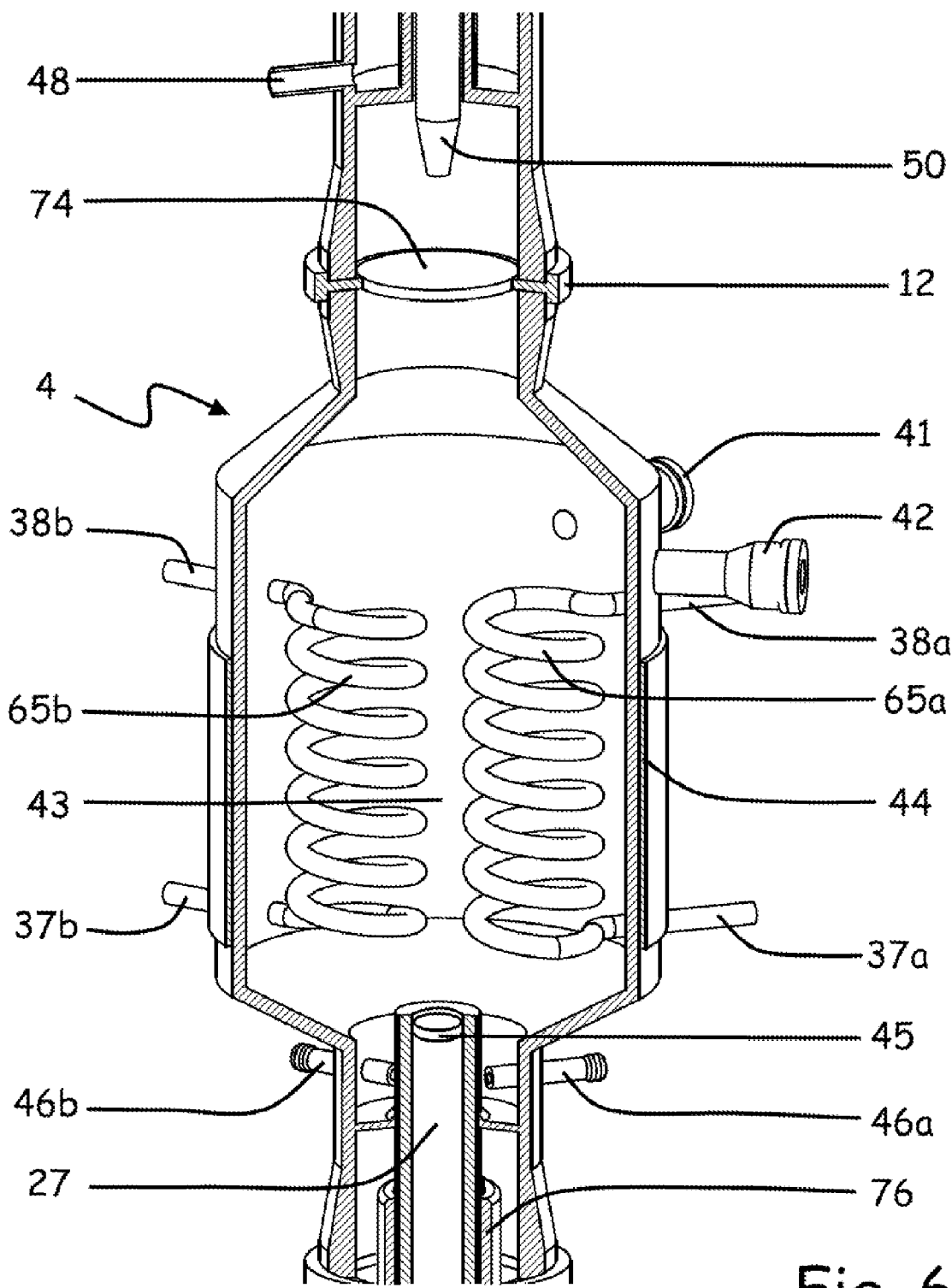
FIG. 6 is a cut-away view of cooling/separation chamber 4 and adjoining sections of a device of the invention.

As shown in FIG. 4, Torion fittings 21 and 22 are adapted and arranged as input sites for reactants such as water and sulphur trioxide, and as input sites for non-reactive or otherwise inert dilution gasses (not shown) such as helium or nitrogen. In another aspect of the cycling and recycling aspects of the invention, Tubes 56$a$, $b$ and $c$ 57$a$, $b$ and $c$, and 6$a$, $b$ and $c$ (Tubes $c$ not shown due to cutaway view) are disposed for feeding residual gasses such as sulfate to Primary Reaction Chamber 2 when the device is in an appropriate mode for recycling such gasses from the lower portions of Cooling/Separation Chamber 4 (shown in FIG. 6 and elsewhere) of the device. Sulfate Input Tubes 56$a$ and 56$b$ (Tube 56$c$ not shown due to cutaway view) are contiguous with Sulfate Feedback Tubes 6$a$ and 6$b$ (Tube 6$c$ not shown due to cutaway view) which are disposed as conduits for residual gasses flowing down from the lower portions of Cooling/Separation Chamber 4, as shown in FIG. 6.

Sulfate Input Tube 57$a$ is contiguous with Sulfate Input Tube 56$a$ and Sulfate Feedback Tube 6$a$. Sulfate Input Tube 57$b$ is contiguous with Sulfate Input Tube 56$b$ and Sulfate Feedback Tube 6$b$, and so forth with respect to Tubes 6.

During operation of a device of the invention, as the injected water and water vapour combines with injected sulphur trioxide to initiate the cyclic operation of the device, a gaseous or mist form of sulfuric acid forms immediately, and begins to Ionize immediately. As the Ionized (and Ionizing) sulfuric acid passes over the iridium-plated metal Ball 24 and in the Gap between iridium plated metallic Ring 25, and metallic Ball 24, energy in the form of one or more sparks, electromagnetic pulses or laser bursts, is provided through, between, or in the vicinity of, Ball and Ring Structure 24/25 of the invention. This addition of energy is absorbed largely by the sulfuric acid and its ionization products, which are in the form of a gas or mist. It is likely that the transfer of the various forms and wavelengths of energy input across the Ball and Ring Structure 24/25 by the one or more sparks, electromagnetic pulses or laser bursts, also include a certain proportion of photo-ionization of the sulfuric acid in the vicinity of the Ball and Ring Structure.

Although such energy can be provided in a number of different ways, one preferred way is by one or a plurality of photoionizing sparks initiated by means of an electrical transformer, capacitor, or outside source, such as a Tesla coil. As an advantage of using a transformer within the device itself, its coils can serve multiple functions in a device of the invention, such as that of providing electromagnetic fields and forces. In the context of Ball 24 and Ring 25, electrical energy from the coil's secondary winding can be adapted and arranged to pass through, and interact with, the sulfuric acid vapour. The completion of this circuit allows or contributes to one or more high energy sparks, for example, sparks having an electrical force of one or multiple thousands of volts, to pass through the sulfuric acid vapor, thus heating the vapor even further.

The input of electrical energy to a device of the invention is provided to facilitate the efficient processing and cycling of the electrochemical reactions taking place therein. TORION Fittings 63$a$, 63$b$ and 63$c$ (not shown due to cutaway) are provided for the input of electrical energy via electrically conductive tubes 66 and 68. Electrically Conductive Tubes 66$a$ and 66$b$ (66$c$ not shown) are disposed through these Torion fittings for the input of alternating current electrical energy to Ring 25 of Ball and Ring Structure 24/25 of Primary Reaction Chamber 2. The electrical energy input is provided in the frequency range of from 50 Herz to 53,000 Herz, and at a voltage range of from 1,000 to 35,000 volts. Insulating TEFLON-Brand PTFE Tubes 67$a$, 67$b$ and 67$c$ (not shown) are provided for insulating electrically conductive tubes 66 from corresponding electrically conductive tubes 68, and are therefore disposed therebetween.

Secondary Stainless Steel Conductors 68$a$, 68$b$ and 68$c$ (not shown) are disposed through Torion fittings 63$a$, 63$b$ and 63$c$ (63$c$ not shown due to cutaway view), and are also provided for the input of alternating current electrical energy to Ball 24 of Ball and Ring Structure 24/25 of Primary Reaction Chamber 2. As with Conductive Tubes 66, the electrical input is provided in the frequency range of from 50 Herz to 53,000 Herz, and in the voltage range of from 1,000 to 35,000 volts. It is noteworthy that, in some preferred embodiments of the invention, the electrical inputs provided by electrically Conductive Tubes 66 ($a$, $b$ and $c$) and 68 ($a$, $b$ and $c$) are preferably essentially 180 degrees out of phase with one another with respect to their voltage and current amplitudes.

As this warm sulfuric acid gaseous or mist form rises past the Ball and Ring Structure 24/25, it creates a low-pressure area behind it under the metal ball, drawing in a non-reactive gas, or "dilution" gas, such as helium, argon or nitrogen. After the process is initiated, and during cycling of the process of the invention, in addition to the non-reactive or "dilution" gas, residual gases from the three main down tubes or feedback tubes from other chambers or zones of the device enter the primary reaction chamber through these Sulfate Input Tubes 56$a$ and 56$b$ (Tube 56$c$ not shown due to cutaway view of FIG. 4). These residual gases include sulfates produced in other parts of the device as well as other by-product chemical species during the cycling of the processes and methods of the invention.

Figure 5:
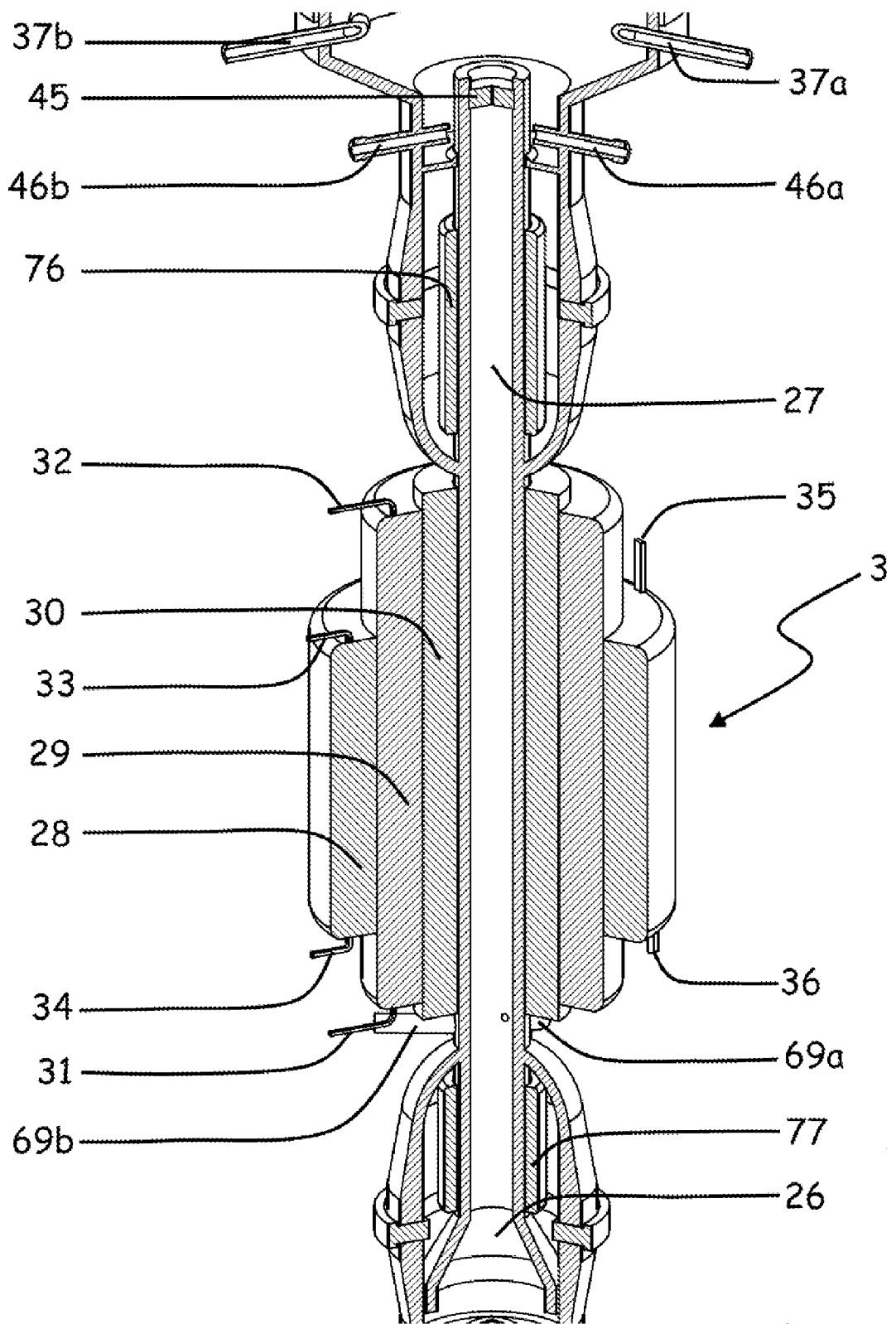
FIG. 5 is a cut-away view of Secondary Reaction Chamber 3 of a typical device of the invention and adjoining components of the invention.

This energized and heated sulfuric acid vapor and various ionic species then travels up into the main reactor core where it is compressed by the inner bell housing above the ball and also encounters a strong magnetic field. The magnetic field strength is preferably at least 80 utesla, more preferably at least 120 utesla, and most preferably at least 200 utesla. In some preferred embodiments of the invention, this magnetic field can be created by a cooled primary electromagnet surrounding the Secondary Reaction Chamber 3, as is shown in FIG. 5. The primary electromagnet can be cooled by any reasonable means, such as liquid nitrogen.

Some of the components of the invention described with respect to FIG. 4 are also shown in one or more of FIGS. 1, 2 and 3 as well as in other figures. The present descriptions of the figures thus overlap and can be integrated with one another to provide understanding of the many permutations of the various operational and physical relationships of the components of devices of the invention, and the processes and methods enabled by them and their equivalents.

FIG. 5 is a cutaway schematic view that shows some of the aspects of the relationships among Secondary Reaction Chamber 3, Oxygen Choke Coil 77, Proton Acceleration Coil 76, and Cooling/Separation Chamber 4 (not shown in FIG. 5 but shown in FIG. 6), as well as related structures. In the structures shown in FIG. 5, the separation process is facilitated with respect to the ionic species traveling upwardly from Primary Reaction Chamber 2, through Center Tube 27 of Secondary Reaction Chamber 3, and into Cooling/Separation Chamber 4.

The electromagnetic fields and resulting forces present in Secondary Reaction Chamber 3 are due primarily to the electromagnetic components surrounding it, including Transformer Coil 28, Electromagnet Coil 29, DC Negative Terminal 31, DC Positive Terminal 32, AC Transformer Coil Input 33, AC Transformer Coil Input 34, AC Transformer Coil Output 35, Transformer Coil Output 36 and Electromagnet Solid Iron Core 30. These components and others are adapted and arranged for controllably providing the electromagnetic fields that are used to assist in the separation of the ionic species travelling through Center Tube 27. These fields are provided through and around Centre Tube 27, and are varied to maximize the performance of a device of the invention.

The effects of these electromagnetic forces are augmented by the forces emitted from Proton Acceleration Coil 76, and serve to propel the separating hydrogen ions upwardly through Center Tube 27 of Secondary Reaction Chamber 3, and into various portions of Chamber 4. Coil 76 emits a positively charged field and therefore repels positively charged protons upwardly through Center Tube 27. Thus, in operation, the fields and forces produced by these components are adapted and arranged to separate sulfate and hydrogen ions from one another, and to direct them to different portions of the overall device for harvesting and further processing. Thus, the forces which act upon the hydrogen ions also act upon the sulfate ions, but with different results. Recirculation Tubes 69a, 69b and 69c are disposed adjacent the lower portions of Secondary Reaction Chamber 3 to provide, for example, access for adding dilution gasses to the device before or during operation cooling.

As is shown in FIG. 5, the ionization products of sulfuric acid, comprising mostly hydrogen ions (protons) and sulfate ions, are subjected to, and are propelled and drawn upwardly into the Center Tube of Secondary Reaction Chamber 3 by electromagnetic fields. In one operational aspect within Center Tube 27 of Secondary Reaction Chamber 3, separating sulfate and hydrogen ions are differentially propelled due to their difference in ionic charge. Center Tube 27 is thus surrounded by means for controllably creating and managing a directed electromagnetic field to provide one or more polarized magnetic fields that are configured to propel positively charged ionic species (hydrogen ions) upward, and to retard the upward progress of negatively charged ions (sulfate), thus helping to separate the two ion species.

To these ends, Proton Acceleration Coil 76 is provided above Secondary Reaction Chamber 3 and below Cooling/Separation Chamber 4, to provide a positive electromagnetic field adapted and arranged to propel positively charged hydrogen ions (protons) upwardly into Cooling/Separation Chamber 4. As another separation factor, Oxygen Choke Coil 77 is provided above Ball and Ring Structure 24/25 and below Secondary Reaction Chamber 3 to provide a negative electromagnetic field adapted and arranged to repel negatively charged oxygen atoms downwardly into and through Primary Reaction Chamber 2. The bottom of Center Tube 27 of Cooling/Separation Chamber 3 is in communication with the void of Bell Housing 26 above Ball and Ring Structure 24/25, while the top of the center tube is in communication with the Cooling/Separation Chamber 4 located above it (shown in FIG. 6 but not in FIG. 5) and therefore functions to direct the ionization products from Primary Reaction Chamber 2, which include protons and sulfate ions, into Centre Tube 27 of Secondary Reaction Chamber 3.

A factor in the energy transfer regarding the methods and processes of the present invention pertains to the nature of the various chemical reactions that take place within devices of the invention. As one example of this, the chemical combination of sulfur trioxide and water is an exothermic one. The heat thus produced raises the temperature of the reactants thereby causing them to increase in volume and pressure. This heat energy input contributes to the formation of a energized gaseous or mist form of primarily sulfuric acid, and residual reactants such as sulfur trioxide and water. Some aspects of this can be expressed by the equation:

$$H_2O + SO_3 = H_2SO_4 \text{ (fine white mist)} + \text{Heat}$$

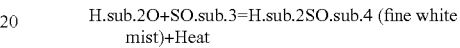

Above Ball 24 and Ring 25, the newly formed hot sulfuric acid mist, which has been further energized by one or more sparks or other energy inputs, travels up the inside of the reaction chamber approaching the middle of the electromagnet where it is subject to the effects and variations of the electromagnetic fields provided therein. Thus, the various ionic species and molecules contained in the vapor or mist experience both the negative and positive polarity of the magnetic field, altering the magnetic moment of the atoms in the $H_2SO_4$ molecule, and contributing to it instability.

In this milieu, a large proportion of the sulfuric acid has already been ionized into $H^+$ (positively charged hydrogen ions) and $SO_4^{-2}$ (negatively charged sulfate). These ions separate from one another because they are literally pulled apart by the polar effects of the magnetic field. Since these two ionic species are oppositely charged, they are thus pulled toward the opposite ends of the main electromagnetic field in Secondary Reaction Chamber 3.

Coolant Input Tubes 37a and 37b (37b not shown due to cutaway view) are disposed for providing coolant to cooling coils that are disposed near the bottom of Chamber 4 (also shown in FIG. 6). Vacuum Tubes 46a and 46b (46c not shown due to cutaway view) are adapted and arranged for removing sulfate ions from the bottom portions of Cooling/Separation Chamber 4 for transport via tubes 6 (a, b, c), 56 (a, b, c) and 57 (a, b, c) to be recycled in Primary Reaction Chamber 2, as is shown in FIG. 4. Coarse Fritted Plate 45 is disposed at the top of Secondary Reaction Chamber 3 to support the beads of Bead Field 43 disposed within Chamber 4.

Some of the components of the invention described with respect to FIG. 5 are also shown in one or more of FIGS. 1, 2 and 3 as well as in other figures. The present descriptions of the figures thus overlap and can be integrated with one another to provide understanding of the many permutations of the various operational and physical relationships of the components of devices of the invention, and the processes and methods enabled by them and their equivalents.

FIG. 6 is a cutaway view that shows some of the aspects of the relative relationships among the top of Secondary Reaction Chamber 3, Cooling/Separation Chamber 4, and the lower portions of Hydrogen Collection Chamber 5, as well as related structures and cooling features. At the top of Secondary Reaction Chamber 3 as shown in FIG. 6, the separation of hydrogen ions proceeds as they exit the upper portions of Center Tube 27 through Coarse Fritted Plate 45 and into Cooling/Separation Chamber 4.

The electromagnetic field present in Secondary Reaction Chamber 3 due to the electromagnetic coil surrounding it (not shown in FIG. 6 but shown in FIG. 5), as well as the forces emitted from Proton Acceleration Coil 76, serve to propel the separating hydrogen ions upwardly through Center Tube 27 of Secondary Reaction Chamber 3, and into Chamber 4. Due to their heavier mass and negative charge, the sulfate ions remain in the lower portions of Chamber 4, where they can be removed via Vacuum Tubes 46a and 46b (Tube 46c not shown due to cutaway view). Due to their lighter mass and positive charge, the hydrogen ions proceed to the top of Separation/Cooling Chamber 4, where they come into contact with a membrane or disk, preferably comprising a fritted Palladium-Coated Plate 74. Plate 74 is described in detail elsewhere herein. Also shown in FIG. 6 is TEFLON-Brand PTFE Coupling 12 which holds and seals Palladium-coated fritted plate 74 between Cooling/Separation Chamber 4 and Hydrogen Collection Chamber 5, and thereby provides a sealed coupling between these two Chambers. Thus, the only access from Chamber 4 to Chamber 5 is through Palladium-Coated Fritted Plate 74.

Figure 12:
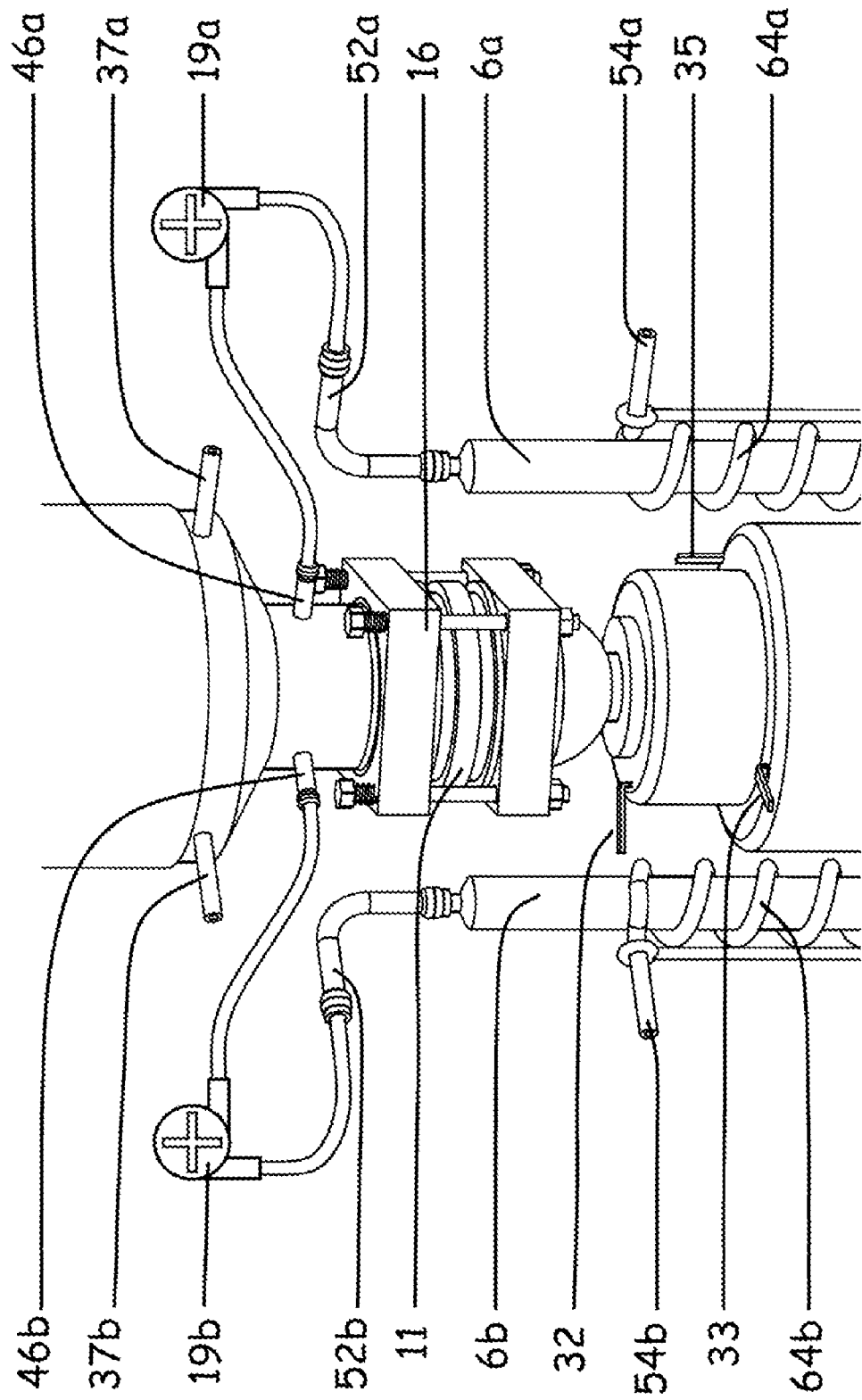
FIG. 12 is an external view of upper portions of the invention showing connections between sulfate recirculation components of the invention, and related components and portions.

Vacuum Tubes 46a, 46b and 46c (46c not shown due to cutaway view) are provided at the bottom of Cooling/Separation Chamber 4 for the purpose of harvesting and transporting the gathered heavier (and negatively charged) sulfate ions to Sulfate Inlet Tubes 52a and 52b and 52c (not shown in FIG. 6 but shown in FIGS. 1, 2, 3, 8 and 9). In some preferred embodiments of the invention, Tubes 46a, b and c are in direct or indirect communication (via one or more pumps as shown in FIG. 12) with Sulfate Input Tubes 52 which are disposed to direct the cooled sulfate ions into Primary Reaction Chamber 2 for recycling. Proton Acceleration Coil 76 is adapted and arranged above Secondary Reaction Chamber 3 and below Cooling/Separation Chamber 4, to provide a positive electromagnetic field adapted and arranged to propel positively charged hydrogen ions (protons) upwardly into and through Cooling/Separation Chamber 4. The positive field of Coil 76 thus can also serve to direct the negatively charged sulfate ions to the lower portions of Chamber 4. TORION fittings 41 and 42 are provided for access to Chamber 4, for example, for one or more pressure or temperature sensors or monitors.

Cooling is also provided to the gasses passing into Chamber 4. In one cooling aspect, Chamber 4 is provided by bead field 43 with heat-absorbent beads (not shown), such as borosilicate glass beads, through which the sulfate and hydrogen ions must travel. Coarse Fritted Plate 45 is provided at the top of Center Tube 27 in order to provide a support for the beads and to keep them located within Chamber 4. In order to remove the heat gathered by the heat absorbent beads, and to provide further cooling and separation capacity for Chamber 4, coolant coils are also provided. Coolant Coils 65a and 65b (Coil 65c not shown due to cutaway view) are shown disposed within and through Bead Field 43 of Cooling/Separation Chamber 4 (beads not shown). In use of the device, Bead Field 43 is packed with any type of beads that can be adapted and arranged for removing a desired quantity of heat from the hydrogen and sulfate ions moving into or through Chamber 4.

Coils 65a, 65b and 65c are fed by coolant transported via Coolant Input Tubes 37a and 37b (Tube 37c not shown due to cutaway view) and Coolant Exit Tubes 38a and 38b (Tube 38c not shown due to cutaway view). In use, Coolant Coils 65a, 65b and 65c would be surrounded, for example, by heat absorbent beads. With respect to the hydrogen ions, because of their charge, these positive $H^+$ ions are driven to the center of the cooling chamber by the positive electrostatic force generated by negatively charged electrostatic Capacitor Plate 44 that is disposed surrounding Cooling Chamber 4.

Due to their heavier mass and negative charge, the sulfate ions tend to rise upwardly through Center Tube 27 more slowly, and to reside in portions of Cooling/Separation Chamber 4 where hydrogen does not. As is shown in FIG. 6, these lower portions of Chamber 4 are disposed adjacent Vacuum Tubes 46a and 46b (46c not shown due to cutaway view). Vacuum Tubes 46a, 46b and 46c are thus disposed for the removal of sulfate ions collected therein, and for communication with Tubes 6 (*a, b* and *c*), 53 (*a, b* and *c*), 56 (*a, b* and *c*) 57 (*a, b* and *c*), and thereby delivery of the sulfate to other parts of the invention for re-use.

With the interaction of the components and forces described herein, separation of the sulfate ions from the hydrogen ions is effected through a number of different interactions of the means of the device and physical/chemical phenomena. Because of their negative charge, the sulfate ions ($SO_4^{-2}$) move upwardly out of the coil much slower than do the hydrogen ions. This slower speed pertains also to most of the other reaction by-products as they are attracted to and held down partially by the effects of the positive field of the electromagnet and move up only by the specific heat energy they contain from their original reaction. These other ions, atoms and molecules are similarly much heavier than $H^+$ ions. This is especially so in view of the fact that a sulfate ion weighs approximately 96 times more than does a hydrogen ion.

Recombination of the sulfate and hydrogen ions into sulfuric acid is prevented by a number of aspects of the methods and devices of the invention. In the separation/cooling chamber, the present methods and devices are adapted and arranged to maintain the separation which occurred between the two main reactant ions in the electromagnetic core chamber. In one aspect, the inert, or non-reactive, nature of the dilution gas (helium, nitrogen or argon, as examples), decreases physical interaction of the two main ion species, and thereby prevents their recombination. In another aspect, the heat present in the chamber along with the electromagnetic eddy from the top of the electromagnet, causes a swirling wind or electromagnetic eddy current to be established in the chamber causing these ions to circulate around the chamber to contact the beads and walls, and transfer heat to these surfaces to thereby cool themselves.

In another aspect, the recombination of sulfate and hydrogen ions is prevented also by the differential positioning of these two main ion species in Chamber 4. Because hydrogen is positively charged and much lighter in weight than sulfate and other by-product ions, it rapidly proceeds to the top of Cooling/Separation Chamber 4 where it is in proximity to Palladium coated plate 74. For these and other reasons, the $H^+$ moves rapidly through the cooling chamber beads and encounters the top of the cooling chamber, building up at the top of the chamber. In another collection/separation aspect, the positively charged hydrogen ions are also repelled from the outside of the chamber, and thus toward Plate 74 by the positive electrostatic charge of Capacitor Plate 44 surrounding the cooling chamber.

In contrast, the sulfate ions and other heavier by-products of the reactions cool more quickly as they move through the bead field, and are drawn to the outside of the chamber by the positive electrostatic charge of Capacitor Plate 44 surrounding the cooling chamber. Moreover, as the sulfate cools through interactions with the beads and cold dilution gas, such as helium, nitrogen, argon and neon, it begins to descend around the outside of the chamber returning down to the bottom of the cooling chamber near Vacuum Tubes 46, as do the other by-products. In accordance with other advantages of the invention, the sulfate is then drawn into one or a plurality of Tubes 46a, 46b and 46c (46c not shown due to cutaway view) and is carried back to the primary reaction chamber under Ball and Ring Structure 24/25 by way of one or more of the Sulfate Tubes 6, 52, 53, 56 and 57.

Recombination into sulfuric acid is also prevented by the removal of protons and hydrogen molecules, which depart Chamber 4 through Plate 74 to reside in Hydrogen Collection Chamber 5. Because Plate 74 permits the passage of hydrogen but not other ionic or molecular species, hydrogen is removed from proximity to other ions. Hydrogen Output Tube 48 is shown in communication with the upper portions of Hydrogen Collection Chamber 5, and thus provides access for collection, cycling or use of collected hydrogen. Also shown in FIG. 6 is Silver and Palladium Plated Brass Electrode 50, which is negatively charged and thus disposed for attracting protons that have passed through Palladium-Coated Plate 74 into Chamber 5.

The return of sulfate to Primary Reaction Chamber 2 is assisted by other components, properties and phenomena. For example, as yet another advantage of the cyclic nature of certain aspects of the invention, the low pressure created beneath the Ring 25 and Ball 24 by the rising hot reactants draws the sulfate ions from the sulfate feedback tubes, and particularly through Sulfate Inlet Tubes 57 (a, b and c) back Into Primary. Reaction Chamber 2 along with the other residual chemical species. These returning sulfate and other chemical species are the residual gasses which are then mixed in with the newly injected warm water in Primary Reaction Chamber 2 to produce a mixture of sulfate Ions, water and sulfate-water ice crystals. As one in the electrochemical arts can be made to appreciate, the cyclic aspects of portions of the present devices and methods can significantly contribute to the efficient and continuing or cyclic operation devices and methods of the invention.

"It is noteworthy that the main reactions sought to be exploited by methods and devices of the invention are not the only ones effected or facilitated by the inventions. Thus, in the chemical, thermal and electromagnetic milieu of the inventions, other ions, molecules and compounds are produced, although in quantities smaller than those of the main reactions and products. These other chemical species include those such as $SO_2$, $H_2S$, $H_2O$, $H_3O^+$ and $HO^-$, as well as a large number of other ions, molecules, complexes and compounds. The proportion of these species that are produced is dependent upon many variable factors, such as the amount and purity of the injected water and sulfur trioxide, the strength, frequency and nature of the input spark or other energy Inputs In the vicinity of the ball and ring, and the strength, direction and frequencies of the magnetic fields applied."

Some of the components of the invention described with respect to FIG. 6 are also shown in one or more of FIGS. 1, 2 and 3 as well as in other figures. The present descriptions of the figures thus overlap and can be integrated with one another to provide understanding of the many permutations of the various operational and physical relationships of the components of devices of the invention, and the processes and methods enabled by them and their equivalents.

This part of the present processes and methods momentarily heats substantial portions of the mixture of de-energized sulfate ions ($SO_4^{-2}$), water and sulfate-water ice crystals, to a temperature between 600 and 1,000 degrees C., to produce a mixture comprising sulfur trioxide, energized sulfuric acid, water and energized ion mixture comprising oxygen ions, sulfur ions and hydrogen ions for cycling as in the initial steps of the process. Each molecule of sulphate ($SO_4^{-2}$) is converted into one molecule of sulfur trioxide and one atom of oxygen ($O^{-2}$). The resulting sulfur trioxide is thus available to form sulfuric acid with additional warm water as in the Initial steps of the process. Thus, in certain aspects of the invention, sulfur trioxide can be continuously recycled through devices, methods and processes of the invention. The recycling of sulfur trioxide Is overall an endothermic process and thus absorbs heat from the high energy spark, electromagnetic pulse or laser input. Certain aspects of the present methods and processes are expressed by the following chemical equations:

$$SO_4^{-2} + Heat = SO_3 + \tfrac{1}{2}O^{-2}$$

Thus, in addition to the production of usable hydrogen and oxygen, the present inventions provide also a flow of electrons in a manner that can be controlled and utilized for many purposes such as to power homes, industries and many types of electrical devices. As one controllable feature of the present inventions, the rate and quantity of the electrical and chemical output can be varied by altering or varying various operational parameters and inputs of the inventions. For example, the greater the input of the chemical reactants, the greater the electrical current flow and the output of oxygen, hydrogen and electricity by devices of the inventions. Current flow can therefore be regulated and controlled by the input of the chemical reactants as well as by varying one or more of many parameters of the device and methods.

As represented by the equation: $O^{-2} + O^{-2} = O_2 + 4^{-e}$, the atomic oxygen recombines to form molecular (diatomic) oxygen "$O_2$." This is achieved only after each atom of oxygen gives up its extra electrons to the $H^+$ thus providing charge balance for both molecular oxygen and hydrogen. Each of these gasses can be removed from their respective collection chambers and stored for future use or utilized immediately. The $2H^+$ has now received two electrons to form pure diatomic hydrogen gas "$H_2$." This gas can then be vacuumed off and pressurized in a separate storage tank, for example, for later use to generate additional electricity through a fuel cell, or burned to generate heat. Either of these follow-on processes generate only water as a by-product that can be recycled and reused in devices and processes of the inventions. Systems, methods, processes and devices of the inventions can therefore be operated in cyclic manners until all the $SO_3$ or water is used. Thus, systems and devices of the invention can be run continuously or intermittently as desired.

As another distinct advantage of the regenerative nature of the inventions, and particularly with respect to the present recycled use of sulphate produced therein, only a small amount of sulfur trioxide is actually used at the start of the process or to boost operation during peek demand, if needed. The water in the system can be recombined through a hydrogen fuel cell and reused, so that only minimal losses will occur within the two main storage systems.

Devices, methods, processes and systems of the invention can be coupled to other systems in numerous ways. For example, the present inventions can be coupled with any industrial processes that produce sulphur trioxide or sulphuric acid. Moreover, the present inventions can also be coupled with apparatus that produce heretofore unwanted or unusable electrical flow.

This newly energized $H_2SO_4$ and other by-product residual gasses input from the sulphate return tubes rises toward and through the ball and ring structure as before. The oxygen molecules are directed otherwise, however. With respect to the applied electromagnetic forces, the reaction process proceeds as these hot reactant moieties (mainly sulphate and hydrogen), are propelled upwardly through the electromagnetic core, and into Cooling/Separation Chamber 3 as shown in FIG. 5. In order to perform its cooling and separation functions, Cooling/Separation Chamber 4 is provided with one or more types of cooling media as described elsewhere herein.

In one key aspect, recombination into sulfuric acid is also prevented by the removal of protons and hydrogen molecules, which depart Chamber 4 through Plate 74 to reside in Hydrogen Collection Chamber 5. Because Plate 74 permits the passage of hydrogen but not other ionic or molecular species, hydrogen is removed from proximity to other ions. Hydrogen Output Tube 48 is shown in communication with the upper portions of Hydrogen Collection Chamber 5, and thus provides access for collection, cycling or use of collected hydrogen. Also shown in FIG. 6 is Silver and Palladium Plated Brass Electrode 50, which is relatively negatively charged to ionic species as a result of the negative charge of Electrode 49, and is thus disposed for attracting protons that have passed through Palladium-Coated Plate 74 into Chamber 5.

Figure 7:
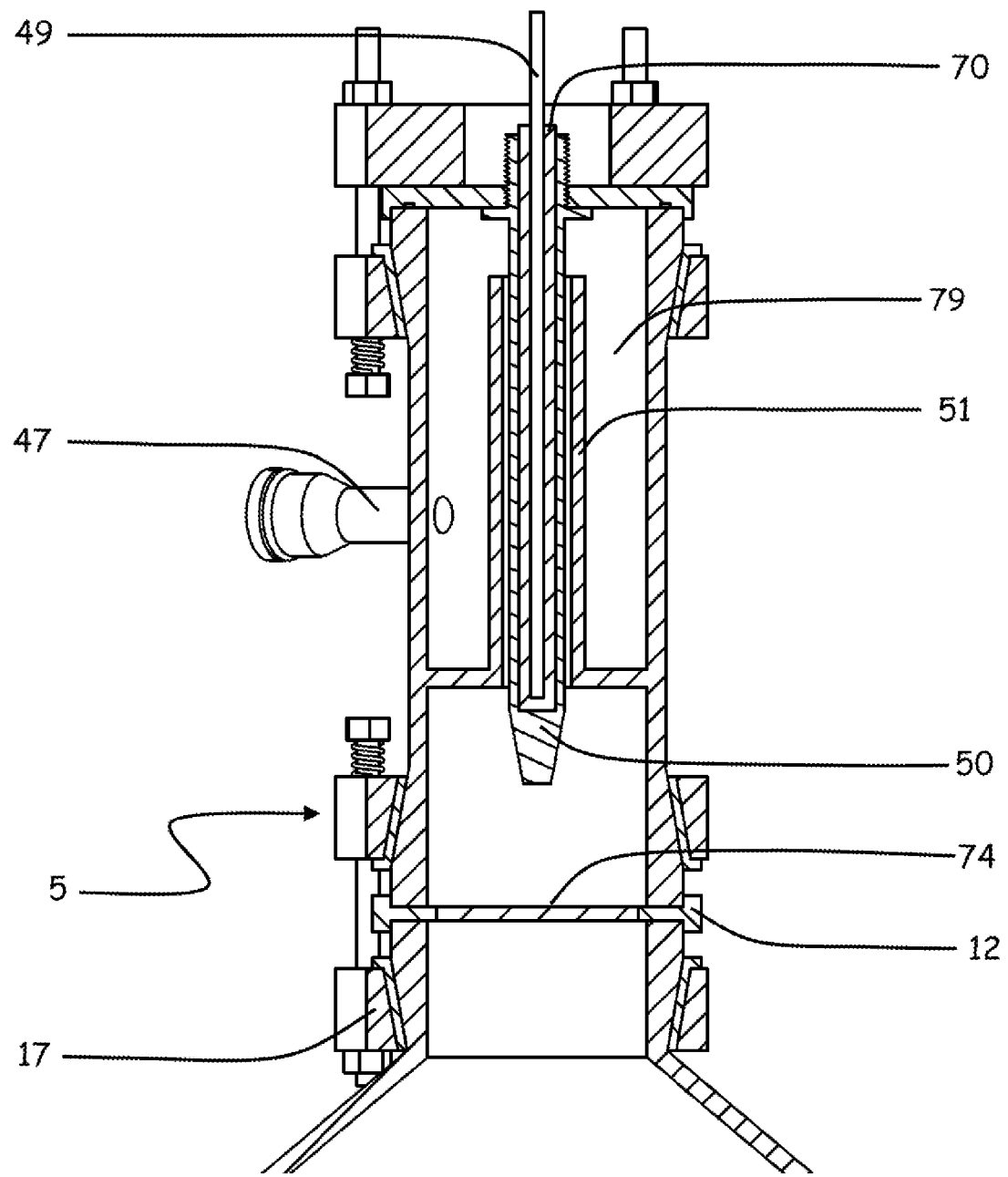
FIG. 7 is a cut-away view of hydrogen collection chamber 5 and adjoining portions of the invention.

FIG. 7 is a cutaway view that shows some of the aspects of the relationships among the components of Hydrogen Collection Chamber 5, as well as related structures, and components. Some of these features and aspects are shown also in FIGS. 6, 1, 2 and 3, as well as other FIGURES herein. In Chamber 5, the collection and concentration of hydrogen ions is effected. In one significant aspect, one or more of upwardly propelled hydrogen molecules and hydrogen ions from Chamber 4 are gathered onto the surface of fritted Palladium-Coated Plate 74 and transmitted through Plate 74 into Chamber 5.

In some preferred embodiments of devices according to the invention, Hydrogen Collection Chamber 5 is disposed above Cooling/Separation Chamber 4 with Negatively-Charged Copper Electrode 49 shown disposed within dielectric insulating sleeve 70. Electron flow between parts of the device is facilitated by one or more electrically conductive connections. Electrode 49 is electrically connected to the high voltage (1,000-35,000 volts) output of Transformer Coil 28 via Connector 33, as is shown in FIGS. 1, 3 and 5. Electrode 50 is electrically connected to Lower Conductive Electrode 61 via Cable 39 and Fuse 40 (shown in FIGS. 1 and 2) to thereby provide for electron transfer between Electrodes 50 and 61. This electron transfer assists in maintaining charge and mass balance in the device, especially between hydrogen and oxygen chemical species.

As electrons from the negatively charged oxygen ions ($O^{-2}$) encounter Electrode 50, they are drawn off by the positive potential present from the protons on Electrode 50, thus utilizing electrons from another part of the device to complete electron flow and provide electrochemical balance. This electrochemical balance is somewhat similar to a dynamic common to battery technologies where the cycling of electrons, and the corresponding chemical species, is effected via electron flow from a positive to a negative electrode. In contrast to conventional batteries, however, the present inventions utilize the novel systems, methods, processes and devices as described herein.

Electrode 50 protrudes into the lower portions of Chamber 5 and provides additional attractive forces for drawing protons upwardly into Upper Chamber 79 and into the proximity of Hydrogen Output Tube 48 (shown in FIG. 6 but not in FIG. 7). In a key aspect, between Chamber 5 Centre Tube 51 and dielectric insulating sleeve 70

Torion Fitting 47 is also provided for access to Hydrogen Collection Chamber 5, for example, by pressure or temperature sensors. Pipe Clamp 17 is provided for sealably connecting the upper portions of Chamber 4 to the lower portions of Chamber 5.

Fritted Palladium Coated Plate 74 is provided as the lower margin of hydrogen collection chamber 5. Palladium coated plate 74 is sealably disposed by PTFE Coupling 12 above Cooling/Separation Chamber 4 such that any gas other than hydrogen which is disposed below plate 74 cannot be transported into Hydrogen Collection Chamber 5. As an additional advantage, the present invention includes other aspects of Plate 74 which assist in the separation and collection of hydrogen.

As an example of such an aspect, Palladium Plate 74 is shown in FIGS. 6 and 7. In one key aspect, Palladium Plate 74 is provided with a coating of palladium, which has a high affinity for hydrogen. In another key aspect, Plate 74 is fritted, that is, porous. The combination of the porosity of the plate, and the presence of the palladium adhered to it, essentially renders Plate 74 an effective hydrogen filter. Palladium-coated plate 74 thus acts to absorb hydrogen from Cooling/Separation Chamber 4 and to transport that hydrogen into Hydrogen Collection Chamber 5. To this end, Plate 74 is sealably disposed between Chamber 4 and Chamber 5. Thus, hydrogen moving between Chambers 4 and 5 must move through Palladium Plate 74.

This transport and collection of the hydrogen moving from Chamber 4 to Chamber 5 is assisted by negatively charged Electrode 50, which protrudes into Chamber 5. Hydrogen Output Tube 48 is provided in communication with Upper Chamber 79, the upper portion of Chamber 5, by means of one or more voids or gaps (not shown) around Center Tube 51 and Electrode 50. These gaps or voids act as a pathway for hydrogen to reach Hydrogen Output Tube 48. This pathway, in conjunction with electrons provided to the hydrogen ions (protons) through electrode 50 and its electrical connection to Electrode 61 of Oxygen Collection Chamber 7, allow formation of molecular hydrogen around Electrode 50, and into the vicinity of Hydrogen Output Tube 48. From Output Tube 48, the hydrogen can be removed from the device, used immediately, or stored for later use.

A palladium plate suitable for use with the invention can be provided in many different forms. Some of these forms are more advantageous than others. For example, in one advantageous form, an inert and porous plate, such as one of glass or ceramic materials, is first provided with a coat of a substance that will increase the bond of the palladium to the plate, for example, silver. Glass or ceramic materials suitable for use in the invention include those made of borosilicate glass.

Thus, one method for producing a hydrogen collecting and filtering plate for use with the invention is to first coat a porous plate of borosilicate glass or ceramic with silver, and then to coat the silver-coated plate with a layer of palladium. The silver coating is preferably of high purity, for example, in excess of 99.5% purity. A silver-coated plate can then be provided with a coating of palladium. Applicant has found that the combination of silver and palladium yields a plate that functions to collect and transmit hydrogen better than a plate coated only with palladium.

In one advantageous embodiment of the palladium-coated borosilicate plate aspect of the invention, Palladium Plate 74 is produced by sequentially coating it in two layers. A first layer of silver in excess of 99.5% purity is applied, for example, by sputtering. A second layer, comprising palladium, is then applied, also preferably via one or more sputtering processes. Although a palladium-coated plate according to the invention is novel and heretofore unknown, sputtering processes known in the general art of metal plating for use in providing coatings of metallic substances, are suitable for applying the coatings of silver and palladium to produce a palladium plate of the invention suitable for gathering and processing hydrogen.

In some preferred embodiments of a hydrogen filtering plate of the invention, the plate is first coated with silver by means of a laser sputtering process to a thickness of from 1 to 3 microns of silver. This layer of silver is gas permeable and allows the transport of gases through the plate. The silver-coated plate is then provided with a second layer, one of palladium. The second layer, which is also provided via sputtering, is of palladium and is provided in a thickness preferably of from 5 to 10 microns, more preferably of from 8 to 12 microns, and most preferably of from 10 to 15 microns. In other preferred embodiments, the coating of palladium is in excess of 15 microns. As one of skill in the appropriate arts will appreciate, many permutations of the materials from which the underlying plate is made, its porosity parameters, and the various and relative thicknesses of the silver and palladium layers, yield numerous embodiments of parameters of this and related aspects of the invention. As another advantageous aspect, a plate coated within these parameters is essentially impermeable to all gasses other than hydrogen.

Figure 8:
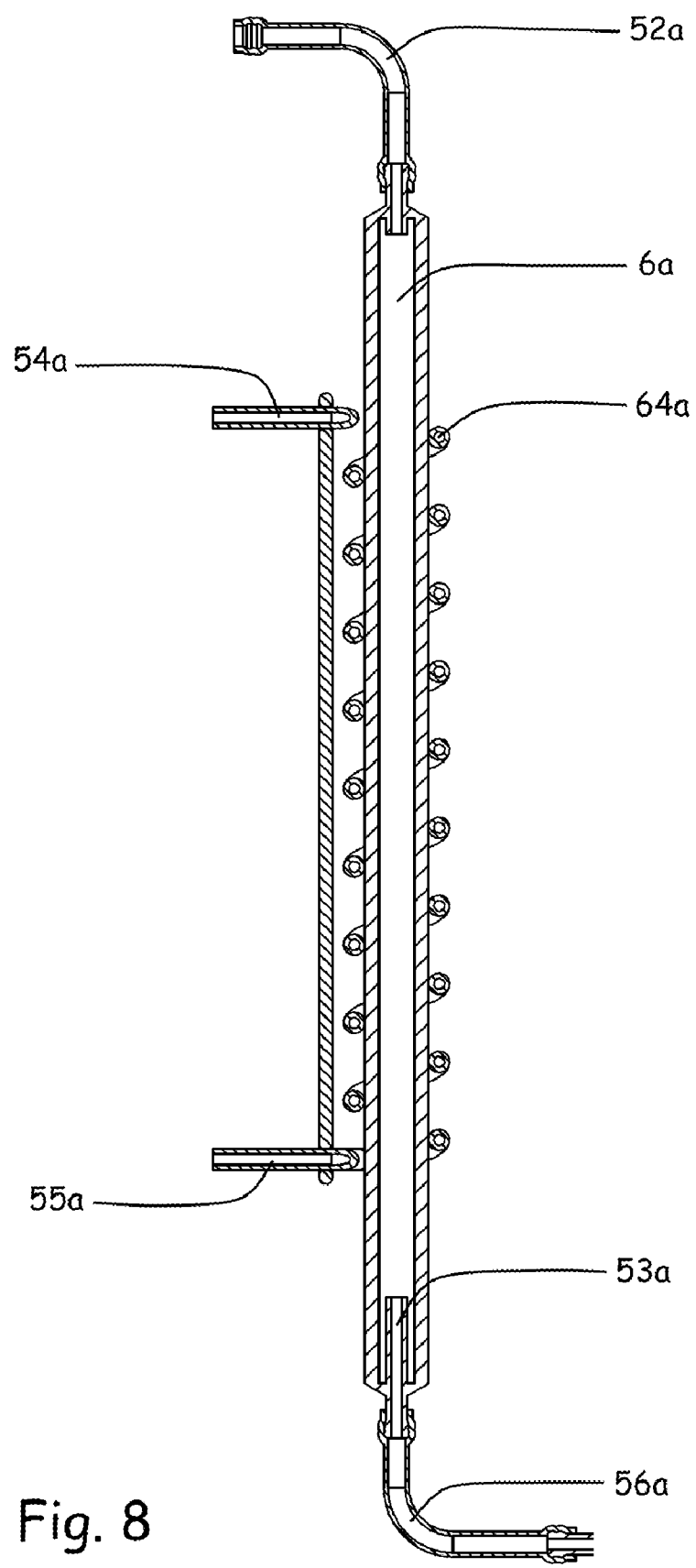
FIG. 8 is a cut-away view of certain components of the invention useful for recirculating and cooling various reactants and portions thereof.
Figure 9:
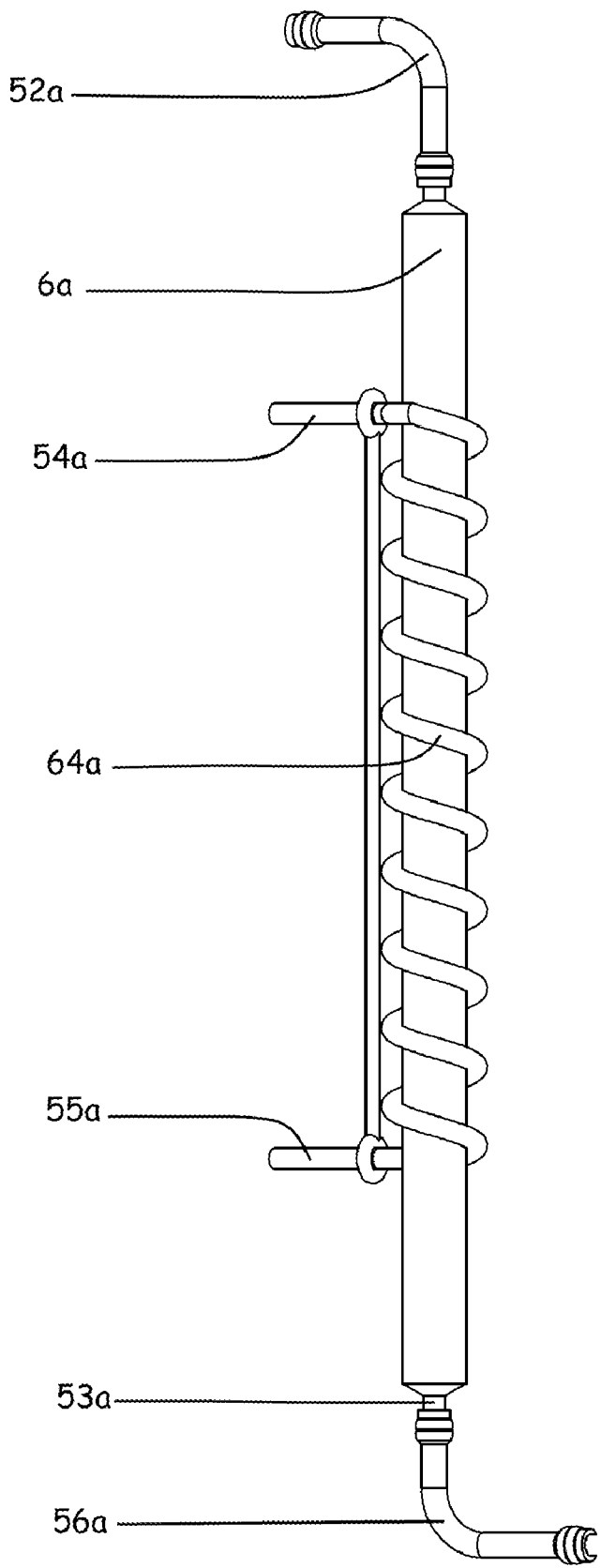
FIG. 9 is an external view of the components of the invention shown in FIG. 8.

FIG. 8 is a cross-sectional schematic view of certain components of the invention useful for cooling various portions of the device. FIG. 9 is an external view of the components of the invention shown in FIG. 8. FIG. 8 is a cross-sectional view that shows also the inter-communicating voids of tubes adapted and arranged for the transportation and cooling of sulfate between portions of the device, and thus for cooling of the sulfate itself. FIGS. 8 and 9 thus show components of the invention adapted for transporting sulfate ions from Cooling Separation Chamber 4 into Primary Reaction Chamber 2. In some embodiments of the invention, one or more pumping means can be provided to further facilitate this transport. In use, Tubes 52*a*, 6*a*, 53*a*, and 56*a* (and their corresponding b and c components not shown) are thus disposed in physical communication between Chamber 4 and Chamber 2.

As shown in FIGS. 8 and 9, Sulfate Inlet Tube 52*a* is adapted for accepting sulfate from the lower portions of Chamber 4. Inlet Tube 52*a* is in sequential communication with Sulfate Feedback Tube 6*a*, Sulfate Exit Tube 53*a* and Sulfate Input Tube 56*a*. In use of some preferred embodiments of a device of the invention, sulfate from Chamber 4 enters tube 52*a*, via means of a pump or vacuum from the ongoing reaction in primary reaction chamber 2, and is transported downwardly through Tubes 6*a*, 53*a* and 56*a* into Primary Reaction Chamber 2. These components of this exemplary embodiment of a device of the invention are also shown in FIGS. 1, 2 and 3 with respect to 52*b* and *c*, 6*b* and *c*, 53*b* and *c*, and 56*b* and *c* but not shown in FIGS. 8 and 9.

With respect to FIGS. 8 and 9, means for cooling sulfate being transported according to the invention are also shown. Coolant Coil 64*a* is disposed around Sulfate Feedback Tube 6*a*, and is in physical contact therewith. Coolant Inlet Tube 55*a* communicates with Coolant Coil 64*a* which, in turn, communicates with Coolant Exit Tube 54*a*. Coolant Coil 64*a*, Tube 55*a* and Tube 54*a* are thus adapted for circulating coolant around Sulfate Feedback Tube 6*a*, thus cooling sulfate ions traveling therethrough. One or more coolant fluids can be directed through these cooling means, and the relative rate and temperature of the one or more coolants can be used to control sulfate low and temperature as well as other parameters. Similar properties and characteristics pertain to Coolant Coils 64*b* and *c*, Sulfate Feedback Tubes 6*b* and *c*, Coolant Inlet Tubes 55*b* and *c*, and Coolant Exit Tubes 54*b* and *c* as shown in other FIGS.

Figure 10:
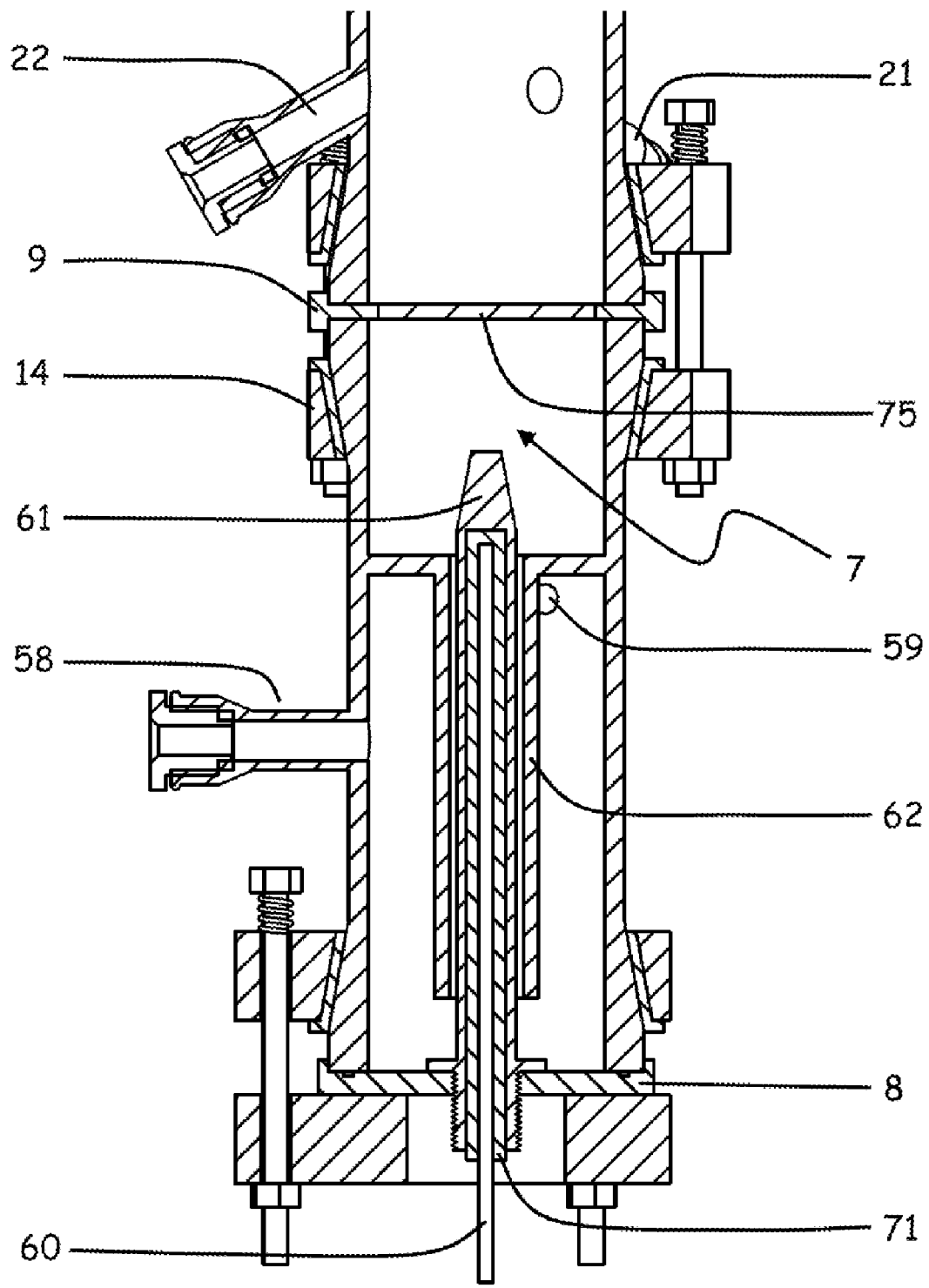
FIG. 10 is a cross-sectional view of oxygen collection chamber 7 as well as related lower electrodes and fittings, and portions of a device of the invention below Primary Reaction Chamber 2.
Figure 11:
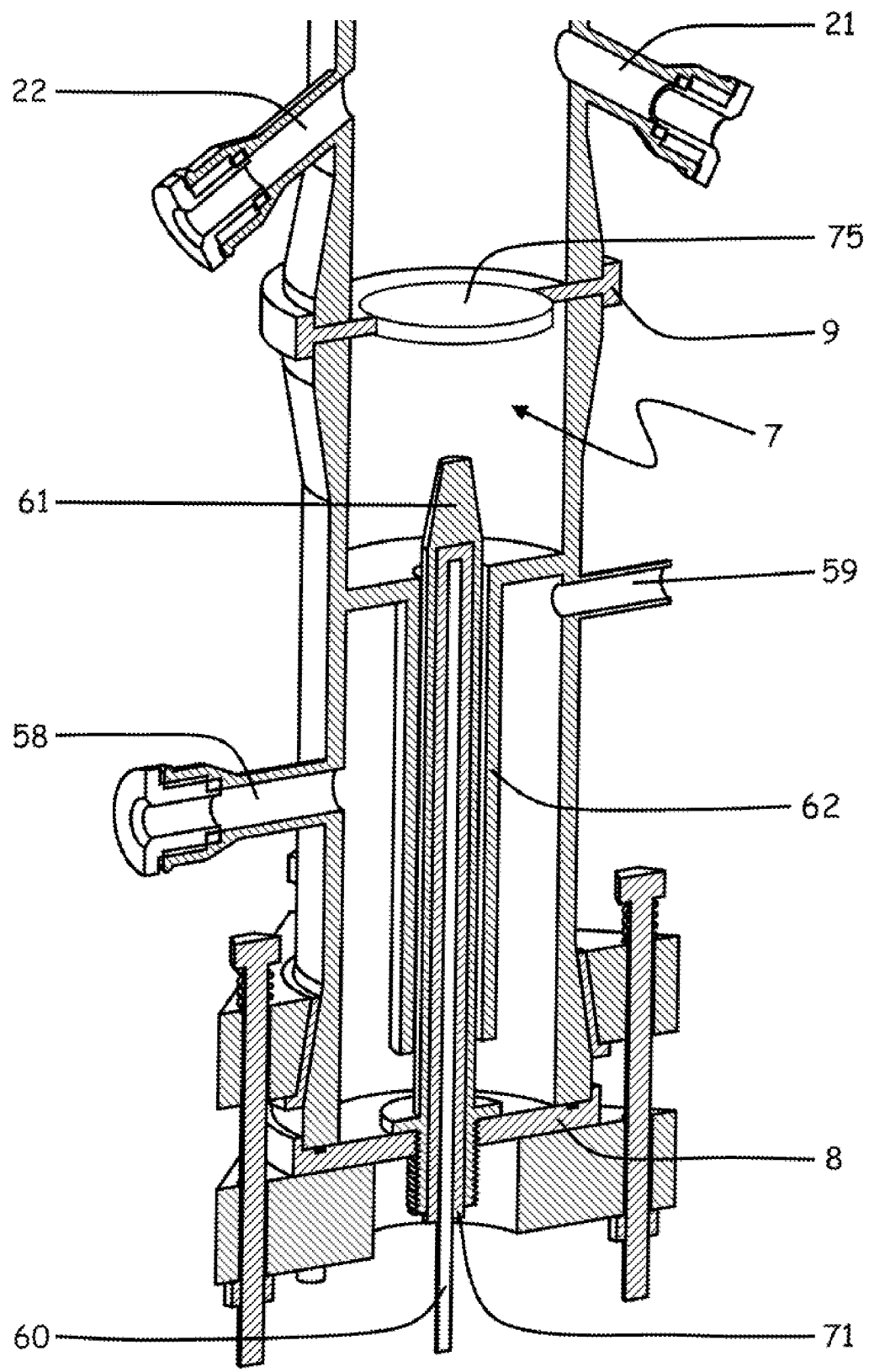
FIG. 11 is an oblique cut-away view of Oxygen Collection Chamber 7 as shown in FIG. 10 and also showing the internal interrelationships between the various electrodes and other components.

FIG. 10 shows a cross-sectional view of oxygen collection chamber 7 as well as related lower electrodes and fittings, and portions of a device of the invention below Primary Reaction Chamber 2. FIG. 11 is an oblique cut-away view of Oxygen Collection Chamber 7 as shown in FIG. 10, and also shows some key internal interrelationships between the various electrodes and other components.

With respect to FIGS. 10 and 11, Fritted Glass Plate 75 forms a boundary between Oxygen Collection Chamber 7 and Primary Reaction Chamber 2 disposed above Chamber 7. As the device operates, oxygen ions are driven downwardly through glass plate 75 and into Chamber 7. Because of its pore size and position, Glass Plate 75 also serves to slow down the transport of sulfate ions downwardly from Primary Reaction Chamber 2 into Oxygen Collection Chamber 7. Forces driving the oxygen ions include the electromagnetic forces provided by Oxygen Choke Coil 77 (shown in FIGS. 2, 3 and 5 but not in FIGS. 10 and 11) as well as the relatively positive charge provided on Electrodes 60 and 61. Stainless Steel Electrode 60 is electrically connected to Electrode 50 as is shown in FIGS. 1, 2 and elsewhere. Electrode 50 is electrically connected to Lower Conductive Electrode 61 via Cable 39 and Fuse 40 (shown in FIGS. 1 and 2) to thereby provide for electron transfer between Electrodes 50 and 61. This electron transfer assists in maintaining charge and mass balance in the device, especially between hydrogen and oxygen chemical species. Electrode 61 is thus adapted and arranged to transfer electrons from the collecting oxygen ions in Oxygen Collection Chamber 7 to hydrogen ions (protons) being collected in Hydrogen Collection Chamber 5. With this transfer of electrons, hydrogen ions become molecular hydrogen and oxygen ions become oxygen molecules.

Stainless Steel Electrode 60 is shown disposed within dielectric Insulating Sleeve 71, and disposed through PTFE Coupling 8 and Centre Tube 62 into Oxygen Collection Chamber 7. Electrode 60 is electrically connected to the high voltage (1,000-35,000 volts) output of Transformer Coll 28 via Connector 34, as Is shown in FIGS. 1 and 3. Oxygen Choke Coil 77 is provided above Ball and Ring Structure 24/25 and below Secondary Reaction Chamber 3 to provide an electromagnetic field adapted and arranged to repel negatively charged oxygen atoms downwardly into Primary Reaction Chamber 2.

Pipe Clamp 14, in conjunction with PTFE Coupling 9 is provided for sealably connecting the upper portions of Chamber 7 to the lower portions of Chamber 2. Oxygen Output Tube 59 is disposed for removing the collected oxygen, which can be removed from the device, used immediately, or stored for later use. TORION Fittings 21 and 22 are adapted and arranged as input sites for reactants such as water, sulfur trioxide and sulfuric acid, and as input sites for inert or otherwise non-reactive dilution gasses, such as helium, nitrogen and argon. TORION Fitting 58 is adapted and arranged as an access site to Chamber 7 for one or more sensors such as pressure and oxygen sensors.

FIG. 12 is an external view of upper portions of the invention showing connections between sulfate recirculation components of the invention, and related components and portions. Most of the components shown in FIG. 12 are also shown in FIGS. 1, 2, 3 and 4. With respect to FIG. 12, pump 19*a* is shown disposed between Vacuum Tube 46*a* and Sulfate Inlet Tube 52*a*, and pump 19*b* is shown disposed between Vacuum Tube 46*b* and Sulfate Inlet Tube 52*b*. During operation of the device, one or more of pumps 19*a*, 19*b* and 19*c* (third pump 19*c* and related components not shown due to cutaway view) can be operated to control the rate of delivery of sulfate ions to Primary Reaction Chamber 2 through Tubes 52*a*, and 6*a*, as well as through Tubes 52 *b* and 6*b* (Tubes 52*c* and 6*c* not shown due to cutaway view). PTFE Coupling 11 and Pipe Clamp 16 are provided to sealably connect upper and lower portions of the device. Cooling capacity for this part of the device is also shown, and is provided by means of Coolant Input Tubes 37a and 37b (37c not shown), Coolant Exit Tubes 54a and 54b (54c not shown) and by Coolant Coils 64a and 64b (64c not shown). Shown electrical components of the device include DC Positive Terminal 32, AC Transformer Coil Output 35 and AC Transformer Coil Input 33.

In some key embodiments, the present invention includes a method for producing one or more forms of one or more of hydrogen, oxygen and electricity, the method comprising the step of C, in an atmosphere comprising at least one dilution gas, subjecting a gaseous or mist form from step B, comprising sulfuric acid, sulfur trioxide and water to energy input from one or a plurality of electrical sparks, electromagnetic pulses, or one or more light or laser energy inputs to produce a mixture comprising energized sulfuric acid, sulfur trioxide, water and an energized ion mixture, then D, exposing a mixture comprising the energized sulfuric acid, sulfur trioxide, water and ion mixture to an electromagnetic field sufficiently strong enough to effectively ionize the sulfuric acid and ion mixture into a mixture comprising primarily hydrogen ions and de-energized sulfate ions, then E, separating the hydrogen ions and sulfate ions from the mixture of Step D by applying one or more of electromagnetic fields, electrostatically charged surfaces and heat absorption through the application of one or more of the group consisting of cooling coils, cooling jackets and cooling beads, to produce separated hydrogen ions and separated, de-energized sulfate ions, then F, sequestering the separated hydrogen ions.

The methods of the invention include further steps that can be adapted and arranged to maximize the efficiency and usefulness of devices, apparatus, methods and processes comprehended by the present invention. For example, Step G includes sequestering the separated, de-energized sulfate ions from Step E into at least one of a plurality of tubes such that they are available for use elsewhere. Step H transporting de-energized sulfate ions from Step G to provide a further source of sulfur and oxygen species for, recycling within the Invention, Step I. combining de-energized sulfate ions with water to produce a mixture of sulfate ions, water and sulfate-water ice crystals, Step J. in an atmosphere comprising at least one dilution gas, subjecting a mixture of sulfate Ions, water and sulfate-water ice crystals to energy input from one or a plurality of electrical sparks, electromagnetic pulses, or one or more light or laser energy inputs to produce a mixture comprising sulfur trioxide, energized sulfuric acid, oxygen ions and energized ion mixture, Step K. recycling the mixture of Step J. comprising sulfur trioxide, energized sulfuric acid, and energized ion mixture, in one or more of Steps C and D, Step L includes sequestering the oxygen ions from Step J via at least one positive electrode to produce molecular oxygen and electrons, Step M providing electrons to the protons via at least one negative electrode such that the providing of electrons via a conductor produces electricity and hydrogen molecules as molecular hydrogen, and Step N includes harvesting the molecular oxygen.

Advantageously, methods of the invention include wherein the sequestering of the hydrogen ions of Step F, is by means of at least one membrane, wherein the at least one membrane is essentially permeable to protons, and essentially impermeable to other atomic and molecular species. Methods of the invention may Include also the further Step of H, transporting de-energized sulfate Ions from Step G to provide a further source of sulfur and oxygen species for recycling within the invention. Moreover, the electrons from the oxygen ions of Step L can be transported via a conductor to the electrode of Step M to enable the formation of molecular hydrogen, thus assisting in maintaining charge and mass balance.

In accordance with other significant aspects of the invention, many of the process steps and reactions are performed in an atmosphere comprising at least one dilution gas in a contained environment comprised of a plurality of chambers or zones with partial vacuum created by external vacuum pumps applied to the invention. Key aspects of a dilution gas, or a mixture of dilution gasses, suitable for use with methods, processes, apparatus and devices of the invention are that It Is essentially non-reactive with the key reactants being used in the methods and processes of the invention, and that it is essentially non-reactive with the components of an apparatus or device of the invention.

Thus, the one or more dilution gasses are preferably selected from inert gases and non-reactive gases such as nitrogen, helium, neon and argon. The dilution gasses may also serve to transfer heat between and among reactants, or between and among components of a device or apparatus of the invention, or between or among reactants and components of a device or apparatus of the invention as the present methods and processes are performed.

In another key aspect, cooling may also be provided in various steps of the processes and methods of the invention. For example, methods of the invention may include wherein one or more of Steps B, C, D, E, F, G, H, I, J, K, L, M and N are performed in a chamber or zone having a temperature of not more than −20 degrees C. and not less than −40 degrees C. Similarly, methods of the invention may include wherein Steps E, F and G are performed with respect to cooling means in an environment adapted and arranged to remove a sufficient amount of heat to assist in separating the various ionic species from one another. Cooling means for use in conjunction with methods, processes, apparatus and devices of the invention can be adapted and arranged in any manner or configuration that provides the cooling capacity desirable in the particular chamber, zone, Step or component of the invention. In one set of preferred embodiments, the cooling means is located in proximity to the species being cooled, and comprises one or more from the group consisting of cooling coils, cooling beads and cooling jackets.

As another advantage, the rates or quantities of reactants processed or produced by methods and means of the invention can be effected, varied and controlled in various ways. As examples, the overall rate of a key cycle of the invention may be effected by the further step of H, providing sufficient water to the process at step I to maintain at least one form of cycling of the method. Similar parameters and advantages pertain to the step of combining oxygen ions from Step J to provide a source of molecular oxygen and electrons.

In accordance with yet other key aspects of the invention, electromagnetic fields and electrostatic forces are employed to assist in the separation and processing of reactants and products of the invention. For example, in the process and method of the invention, at least one of a plurality of electromagnetic fields is adapted and arranged to propel positively charged ionic species (protons) toward a hydrogen collection chamber, and to retard the upward progress of negatively charged ionic species (sulfate ions).

As another example, a hydrogen ion acceleration coil preferably is provided to assist in propelling positively charged ionic species, for example, protons, toward a hydrogen collection chamber. Similarly, an oxygen choke coil preferably is provided to assist in repelling negatively charged oxygen ions toward a oxygen collection chamber, wherein the oxygen collection chamber is disposed separately from the hydrogen collection chamber, for example, near the bottom of a primary reaction chamber of a device of the invention.

In order to provide for even more efficient use and operation of the invention, one or more steps of the method may be coupled to one or more sources of reactants or energy, or to one or more other processes. As an example, the collection of one or more of hydrogen and oxygen can be coupled to a process needing fuel. Thus, the collected hydrogen can be oxidized with the collected oxygen to thereby provide one or more of heat and water for use in an electricity generating station or fuel cell.

As another aspect of efficiency and operational control, one or more parameters of one or more steps of the methods and processes of the invention, may be controlled by automated means, consisting of programmable logic circuits producing digital or analog signals. For example, one, all or a plurality of steps of the invention may be controlled by one or more computers.

The cyclic nature of the invention is one of its key advantageous aspects. Because of this, the present invention provides for initiating the cycling of the invention in a number of ways. As one example with respect to the processes and methods of the invention, the preliminary Steps of A, B, C, D, E, F, G, H, I, J and K may be performed. The cyclic nature of the process and method of the invention is then performed by performing the Steps D, E, F, G, H, I, J, K, L, M, and N as in the process and methods of the invention.

As part of this cyclic nature, de-energized sulfate ions sequestered in Step G are transported for use in Steps I, J and K. Thus, methods and processes of the invention further comprise Step H, the step of transporting sulfate ions from Step G to provide a further source of sulfur and oxygen species in one or more of Steps I, J and K. Thus, after Step H, the addition of sulfur trioxide in Step B may be decreased or stopped as desirable to control the rate or amount of production in the methods and processes of the device.

As another means of control, the rate of the chemical reactions of the method can be controlled by one or more of a) varying the amount of water introduced into Step B and I of the method, and b) varying the amount of one or more of sulfur trioxide and sulfate introduced into one or more of Steps B and I of the method. Advantageously, the sulfur trioxide of Step B can be a waste material from an industrial process, thus coupling the process to the beneficial use of an otherwise wasted asset.

Further benefits of the invention can be realized by utilizing external sources of energy for energizing the sulfuric reactants in the invention. Thus, a source of electrical or photo-ionizing energy for one or more steps of the process can be one or more from the sources including batteries, fuel cells, alternative renewable energy sources, energy from chemical reactions, energy from nuclear power plants or other nuclear reactions, energy directly from sunlight or from electricity generated from solar facilities. As one of skill in the relevant arts can appreciate, one or more steps of the present methods, or one or more components of the present devices, can be coupled to one or more other methods, devices or reactant streams to thereby increase one or more of 1) the efficiency of the method, 2) the output of the method, and 3) the adaptability of the method to specific uses.

The present invention includes also devices and apparatus for producing one or more forms of one or more of hydrogen, oxygen and electricity. In many preferred embodiments, a device or apparatus of the invention comprises C, at least one means C, wherein means C is adapted and arranged to provide an atmosphere comprising at least one dilution gas, the means being adapted and arranged for subjecting a mist or vapor comprising sulfuric acid, sulfur trioxide and water to energy input from one or a plurality of electrical sparks, electromagnetic pulses, or one or more light or laser energy inputs to produce a mixture comprising energized sulfuric acid, sulfur trioxide, water and an energized ion mixture, at least one means D, wherein means D is adapted and arranged for exposing the energized sulfurric acid, sulfur trioxide, water and and an energized ion mixture to an electromagnetic field sufficiently strong enough to effectively ionize the sulfuric acid and ion mixture into a mixture comprising primarily hydrogen ions and sulfate ions, and at least one means E, wherein means E is adapted and arranged for separating the hydrogen ions and sulfate ions from the mixture of means D by applying one or more of electromagnetic fields, electrostatically charged surfaces and a means of absorbing heat through the application of one or more of the group consisting of cooling coils, cooling jackets and cooling beads, as means for producing separated protons and separated de-energized sulfate ions.

A device or apparatus of the invention preferably further comprises at least one means F, wherein means F is adapted and arranged for sequestering the separated hydrogen ions, and at least one means M, wherein means M is further adapted and arranged for providing electrons to the hydrogen ions via at least one negative electrode, such that the providing of electrons to the hydrogen ions via a conductor produces electricity and hydrogen molecules as molecular hydrogen, at least one means G, wherein means G is further adapted and arranged for sequestering the separated de-energized sulfate ions into at least one of a plurality of sulfate Input tubes such that they are available for use elsewhere, at least one means L, wherein means L is adapted and arranged for sequestering the oxygen ions from means J via at least one positive electrode to produce molecular oxygen and electrons, and at least one means N, wherein means N Is further adapted and arranged for harvesting the molecular oxygen.

As an additional advantage, the methods, processes, devices and apparatus of the invention can be configured to produce electricity suitable for immediate use or storage with respect to numerous residential, industrial and developmental requirements. Electricity thus produced can be used to fulfill many needs, such as powering industrial processes or homes. As examples, because the present invention also produces hydrogen and oxygen, it is also quite suitable for powering many types of vehicles and similar devices. This is so partly because hydrogen is a nearly perfect fuel. The combustion of hydrogen by oxidation produces water, an environmentally friendly substance. Thus, hydrogen and oxygen produced by the present invention can be combined in an engine, such as an internal combustion engine, to power a vehicle. Moreover, electricity produced simultaneously by the invention can be used to power other features of the vehicle, such as radios and communications equipment as well as electrical motors commonly found in hybrid vehicles. The invention is thus also ideal as a source of power for spacecraft, where efficiency and the cyclic use of resources are paramount.

As a further advantage of some embodiments of the present methods, devices, processes and apparatus of the invention, they utilize novel means and methods for sequestering hydrogen or protons produced by the invention. As an example, the sequestering of the one or more of protons and hydrogen molecules by means F is preferably by means of at least one membrane, wherein the at least one Membrane is essentially permeable to one or more of protons and hydrogen molecules, and essentially impermeable to other atomic and molecular species. A preferable membrane of the invention comprises metallic coatings, and is further adapted and arranged for transporting sulfate ions, for example, from means G to provide a further source of sulfur and oxygen species in one or more of means H, I, J, K, and L.

As another key aspect of charge and mass balance, in some preferred embodiments of the invention, electrons from the oxygen ions of means L are transported via one or more electrical conductors to the electrode of means M to enable the formation of molecular hydrogen. As disclosed elsewhere herein, a device, apparatus, method or process of the invention can be adapted and arranged to provide one or more of sufficient water, sulfur trioxide and sulfate to the one or more of means B and I to maintain at least one form of cycling of the device. Moreover, the invention is adapted and arranged further for combining oxygen ions from means J and L to provide a source of molecular oxygen and electrons.

As is discussed herein, the present devices and apparatus such that at least one of the electromagnetic fields is adapted and arranged to propel positively charged ionic species toward a first collection chamber in the device, and to retard the upward progress of negatively charged ionic species, and wherein a proton acceleration coil is provided to assist in propelling positively charged ionic species toward the first collection chamber. Additional components and elements of the present apparatus and devices and their interrelationships are discussed elsewhere herein.

As another significant advantage, the present invention includes heretofore unknown business methods that are adapted and arranged to exploit the advantages of the methods, processes, devices and apparatus of the invention while providing efficient and environmentally friendly fuel and energy production services, as well as a friendly environmental footprint. The present invention thus includes a method of doing business in one or more of the fields of energy production, fuel production, and efficiency, the method comprising the steps of i) converting one or more of water, sulfur compounds, and sulfuric acids into one or more forms of hydrogen, oxygen and electricity, wherein essentially no undesirable byproducts are produced, and then ii) selling the resultant products in a marketplace. Key aspects of this business method include wherein essentially no net greenhouse gases are produced, and wherein essentially no net carbon compounds are produced.

As an advantage, the present methods can be coupled with one or more of A) another process for energy production, and B) a facility, such as a factory, warehouse or electrical generating station, that requires one or more of the resultant products. The present invention also includes a business method comprising the steps of 1, purchasing one or more of water, sulfur compounds, and sulfuric acids, and then, 2, converting the one or more forms of hydrogen, oxygen and electricity into one or more forms of one or more of hydrogen, oxygen and electricity, wherein the sources of the one or more of water, sulfur compounds, and sulfuric acids are industrial waste or byproducts.

As yet another advantage, the present invention includes a method of doing business in one or more of the fields of energy production, fuel production, and efficiency, the method comprising the steps of a) providing one or more devices, wherein the one or more devices are adapted and arranged for converting one or more of water, sulfur compounds, and sulfuric acids into one or more forms of hydrogen, oxygen and electricity, wherein essentially no undesirable byproducts are produced, and then b) renting, selling or leasing the one or more devices in a marketplace.

As another advantageous aspect, the invention includes novel means and methods for gathering or sequestering protons and hydrogen molecules, and for producing devices for assisting in doing so. Thus, in some embodiments, the present invention includes a process for creating a membrane or disk, wherein the membrane or disk is selectively permeable to one or more of protons and hydrogen molecules, the process comprising the steps of A, providing a substrate, the substrate comprising a plurality of pores, wherein the size of the pores falls within a desired range, and the substrate is suitable for coating with one or more metals, then B, coating at least part of the substrate with a layer of a first metal to produce a metal-primed substrate, and then C, coating at least part of the metal-primed substrate with an amount of a second metal sufficient to make the membrane essentially permeable to one or more of protons and hydrogen yet essentially impermeable to other atomic and molecular species.

Substrates suitable for practicing the invention include those which are commercially available, such as glass or ceramic disks available in fritted form, for example, from Fisher Scientific, Inc., Cole-Palmer, Inc or Pegasus Industrial Specialties Inc.

Preferably, one or more of the first and second metals has a high affinity for one or more of protons and hydrogen molecules. Advantageously, the coating of the substrate with one or both of the first and second metals may be achieved by sputtering. In accordance with other aspects of the invention, the silver is provided in a layer of preferably of from 0.1 to 10.0 microns in thickness, more preferably from 0.1 to 5.0 microns in thickness, even more preferably from 0.1 to 2.0 microns in thickness, and most preferably from 0.1 to 1.0 microns in thickness. In another key aspect, the second metal is provided in a layer preferably of from 1.0 to 20.0 microns in thickness, more preferably from 1.0 to 10.0 microns in thickness, even more preferably from 1.0 to 5.0 microns in thickness, and most preferably in a layer of from 1.0 to 2.0 microns in thickness.

Advantageously, there are many choices of metals and combinations thereof that can be used to create a membrane or disk of the invention. Thus, any metal or substance that functions to do one or both of increasing the binding of the second layer to the first layer, and increasing the affinity of the metallic layers and membrane for protons or hydrogen molecules, is suitable for use in the invention.

Examples of such first metals include wherein the first metal is one or more of, or is an alloy of, metals selected from the group of non-hydride forming metals consisting of silver, palladium, platinum, cadmium, osmium, iridium, ruthenium, rhodium, and lithium. Similarly, examples of such second metals include wherein the second metal is one or more of, or is an alloy of, metals selected from the group of non-hydride forming metals consisting of silver, palladium, platinum, cadmium, osmium, iridium, ruthenium, rhodium, and lithium. In one especially preferred embodiment, the first metal is silver and the second metal is palladium.

In another aspect of the invention, the size of the pores of the substrate before it is coated with the one or more metals, should fall within a desired pore range. In accordance with this aspects of the invention, the desired pore range of the substrate is preferably from 0.1 to 25.0 microns, more preferably, from 0.1 to 10.0 microns, even more preferably from 0.1 to 5.0 microns, and most preferably from 0.1 to 2.0 microns. An additional aspect relates to the relative coverage of the first and second metals of the substrate. The substrate has a first side surface and a second side surface disposed opposite one another, as well as edge surface portions connecting the first and second sides. Advantageously, in order for a membrane or disk of the invention to function, the first and second coatings need only cover one of the first and second surfaces of the membrane to the extent necessary to achieve the selective permeability and affinity desired. Thus, in some embodiments of this aspect of the invention, only one of the first and second sides need be coated with the two metals.

The invention includes also embodiments of devices for sequestering one or more of protons and hydrogen molecules from a mixture of other atomic and molecular species, the device comprising i) at least one membrane or disk, wherein the at least one membrane or disk is selectively permeable to one or more of protons and hydrogen molecules, and wherein the membrane comprises a substrate, the substrate comprising a plurality of pores, wherein the size of the pores falls within a desired range, ii) a primary coating of a first metal disposed upon at least part of the substrate, and iii) a secondary coating of a second metal disposed upon at least part of the primary coating wherein the primary and secondary coatings comprise a sufficient amount of the first metal and the second metal to make the membrane essentially permeable to one or more of protons and hydrogen molecules, yet essentially impermeable to other atomic and molecular species.

Preferably, one or more of the first and second metals is one or more of, or is an alloy of, metals selected from the group of non-hydride forming metals consisting of silver, palladium, platinum, cadmium, osmium, iridium, ruthenium, rhodium and lithium. In one especially preferred embodiment, the first metal is silver and the second metal is palladium.

Preferably, a device of the invention is operatively coupled to, or further comprises, at least one chamber sealably disposed around the membrane or disk to an extent sufficient to permit collection of one or more species of the protons and hydrogen molecules from the gaseous mixture brought into contact with the membrane or disk.

The present description is illustrative only, and does not limit the scope or spirit of the invention. As one skilled in the relevant art can appreciate, numerous variations of the devices, apparatus, methods and processes fall within the scope of the present disclosure.

What is claimed is:

1. A method for producing one or more forms of one or more of hydrogen, oxygen and electricity, the method comprising the steps of:
   A. providing a device with a contained environment comprised of a plurality of chambers zones, within which many of the process steps and reactions will be performed, wherein external vacuum pumps are applied to the device to produce a partial vacuum within the plurality of chambers or zones,
   B. in an atmosphere comprising at least one dilution gas, combining water and sulfur trioxide to produce a mixture of sulfuric acid, sulfur trioxide and water in a highly energized gaseous or mist form,
   C. in the atmosphere comprising at least one dilution gas, subjecting the highly energized gaseous or mist form of Step B, comprising sulfuric acid, sulfur trioxide and water to energy input from one or a plurality of electrical sparks, electromagnetic pulses, or one or more light or laser energy inputs to produce a mixture comprising energized sulfuric acid, sulfur trioxide, water and an energized ion mixture comprising oxygen ions, sulfur ions and hydrogen ions,
   D. exposing the mixture produced in Step C comprising energized sulfuric acid, sulfur trioxide, water and energized ion mixture to at least one of a plurality of electromagnetic fields sufficiently strong enough to effectively ionize the sulfuric acid and ion mixture into a mixture comprising primarily hydrogen ions and sulfate ions,
   E. separating the hydrogen ions and sulfate ions from the mixture comprising the primarily hydrogen ions and sulfate ions of Step D by applying one or more of electromagnetic fields, electrostatically charged surfaces and heat absorption through the application of one or more of the group consisting of cooling coils, cooling jackets and cooling beads, to produce separated hydrogen ions and separated de-energized sulfate ions,
   F. sequestering the separated hydrogen ions of Step E through at least one membrane separating a cooling/separation chamber and a hydrogen collection chamber which are two of the plurality of chambers or zones in Step A.,
   G. sequestering the separated, de-energized sulfate ions of Step E into at least one of a plurality of sulfate input tubes which are in structural communication with the one or more of the plurality of chambers or zones of Step A such that the separated, de-energized sulfate ions are avaliable for use elsewhere,
   H. transporting de-energized sulfate ions from Step G to provide a further source of sulfur and oxygen species for recycling within the device,
   I. combining de-energized sulfate ions with water to produce a mixture of sulfate ions, water and sulfate-water ice crystals,
   J. in the atmosphere comprising at least one dilution gas, subjecting the mixture of sulfate ions, water and sulfate-water ice crystals of Step l to energy input from one or a plurality of electrical sparks, electromagnetic pulses, or one or more light or laser energy inputs of Step C to produce a mixture comprising sulfur trioxide, energized sulfuric acid, water and energized ion mixture comprising oxygen ions, sulfur ions and hydrogen ions,
   K. recycling the mixture of Step J comprising sulfur trioxide, energized sulfuric acid, water, oxygen ions and energized ion mixture, in Step D,
   L. sequestering the oxygen ions from Step J via at least one positive electrode to produce molecular oxygen and electrons,
   M. providing the electrons of Step L to the sequestered hydrogen ions of Step F via at least one negative electrode, such that the providing of the electrons to the hydrogen ions via a conductor produces electricity and molecular hydrogen and
   N. harvesting the molecular oxygen,
   wherein all steps of claim 1 must be read in consecutive order as shown, to represent the desired sequence of the steps, and the cyclic nature of the method.

2. The method of claim 1, wherein the sequestering of the hydrogen ions of Step F causes the hydrogen ions to pass through the at least one membrane wherein the at least one membrane is essentially permeable to hydrogen ions, and essentially impermeable to other atomic and molecular species.

3. The method of claim 2, wherein the at least one membrane comprises a substrate, the substrate comprising a plurality of pores, wherein the size of the pores falls within a desired range from 0.1 to 25.0 microns, wherein the substrate further comprises i) a primary coating of a first metal disposed upon at least part of the substrate, and ii) a secondary coating of a second metal disposed upon at least part of the primary coating wherein the primary and secondary coatings comprise a sufficient amount of the first metal and the second metal to make the at least one membrane essentially permeable to hydrogen ions, yet essentially impermeable to other atomic and molecular species.

4. The method of claim 3, wherein the first metal is one or more of, or is an alloy of, metals selected from the group of non-hydride forming metals consisting of silver, palladium, platinum, cadmium, osmium, iridium, ruthenium, rhodium, and lithium.

5. The method of claim 3, wherein the first metal is silver and the second metal is palladium.

6. The method of claim 1, wherein the electrons from the oxygen ions of Step L are transported to the electrode of Step L to enable the formation of molecular hydrogen.

7. The method of claim 1, wherein the dilution gas of Steps B, C and J is one or more gases selected from the group of inert gases and non-reactive gases consisting of nitrogen, helium, neon and argon.

8. The method of claim 1, wherein one or more of Steps B, C, D, E, F, G, H, I, J, K, L, M and N are performed in at least one of the plurality of chambers or zones of Step A having a desired temperature of not more than −20 degrees C. and not less than −40 degrees C.

9. The method of claim 1, providing sufficient water to the process at Step I, to maintain at least one form of cycling of the method.

10. The method of claim 1, combining oxygen ions from Step J, to provide a source of molecular oxygen and electrons.

11. The method of claim 1, wherein at least one of the plurality of electromagnetic fields of Step D is adapted and arranged to propel positively charged ionic species upwards toward the hydrogen collection chamber of Step F, and to retard the upward progress of negatively charged ionic species.

12. The method of claim 1, wherein a hydrogen ion acceleration coil is provided to assist in propelling positively charged ionic species upwards toward the hydrogen collection chamber of Step F.

13. The method of claim 1, wherein an oxygen choke coil is provided to assist in repelling negatively charged oxygen ions downwards toward an oxygen collection chamber which is one of the plurality of chambers or zones in Step A of claim 1, wherein the oxygen collection chamber is disposed separately from the hydrogen collection chamber.

14. The method of claim 1, wherein Steps E and F are performed in the contained environment of Step A, adapted and arranged in at least one of the plurality of chambers or zones of Step A to remove a sufficient amount of heat to assist in separating the various ionic species from one another.

15. The method of claim 14 wherein the removal of sufficient amount of heat occurs in proximity to the species being cooled, through application of one or more of cooling coils, cooling beads and cooling jackets.

16. The method of claim 1, wherein one or more steps of the method of claim 1 are coupled to one or more sources of reactants or energy, or to one or more other processes.

17. The method of claim 1, wherein one or more parameters of one or more steps of the method of claim 1 are controlled by automated means consisting of programmable logic circuits producing digital or analog signals.

18. The method of claim 1, wherein sulfate ions sequestered in Step G provide a further source of sulfur and oxygen species in one or more of steps H, I, J, K and L.

19. The method of claim 1, wherein, after Step J, the addition of sulfur trioxide in Step B is decreased or stopped.

20. The method of claim 1, wherein the rate of the chemical reactions of the method is controlled by one or more of a) varying the amount of water introduced into Steps B and I of the method, and b) varying the amounts of one or more of sulfur trioxide of Step B, and sulfate of Step I of the method.

21. The method of claim 1, wherein the sulfur trioxide of Step B is a waste material from an industrial process.

22. The method of claim 1, wherein a source of electrical or photoionizing energy for one or more steps of the process is one or more from the sources including batteries, fuel cells, alternative renewable energy sources comprising solar power, energy from chemical reactions, energy from nuclear power plants or other nuclear reactions, energy directly from sunlight or from electricity generated from solar facilities.

23. The method of claim 1, wherein one or more steps of the method of claim 1 are coupled to one or more other methods, devices or reactant streams to thereby increase one or more of the efficiency of the method of claim 1, the output of the method of claim 1, and the adaptability of the method of claim 1 to specific uses.

24. The method of claim 1, wherein both the positive and negative electrodes of steps L and M are comprised of inner and outer electrodes, separated by a dielectric insulating sleeve.

* * * * *

UNITED STATES PATENT AND TRADEMARK OFFICE
CERTIFICATE OF CORRECTION

PATENT NO. : 8,404,098 B2
APPLICATION NO. : 12/197211
DATED : March 26, 2013
INVENTOR(S) : Thomas Charles Savage It is certified that error appears in the above-identified patent and that said Letters Patent is hereby corrected as shown below:

In the Specification

Column 12
line 11, after "$SO_4^{-2}+Heat=SO_3+1/2O^{-2}$", insert as separate specifications:

--Then, as before in the process:
$SO_3+H_2O=H_2SO_4+Heat$--

--and the remaining $O^{-2}$ atom joins with another $O^{-2}$ atom to produce molecular oxygen as well as a flow of electrons. Thus:
$O^{-2}+O^{-2}=O_2+4^{-e}(electrons)$--

Column 13
line 62, after "dielectric insulating sleeve 70", insert:

--, is provided a circumferential gap or void (shown only by lines) disposed for collecting hydrogen which has been gathered into Collection Chamber 5 and for directing the hydrogen to Hydrogen Upper Collection Chamber 79. Hydrogen Output Tube 48 is thereby in communication with Chamber 5. Thus, there is provided physical communication between the lower portion of Chamber 5 and its Upper Portion 79. From Tube 48, collected hydrogen can be removed from the device, used immediately, or stored for later use.--

Signed and Sealed this
Twenty-fourth Day of September, 2013

Teresa Stanek Rea
*Deputy Director of the United States Patent and Trademark Office*